(12) United States Patent
Ragnar Strömberg

(10) Patent No.: US 11,714,499 B1
(45) Date of Patent: Aug. 1, 2023

(54) FLEXIBLE OR BENDABLE MAT, BAND OR CYLINDER

(71) Applicant: TRAPPER HOLDING AB, Järfälla (SE)

(72) Inventor: Rolf Eric Ragnar Strömberg, Skå (SE)

(73) Assignee: TRAPPER HOLDING AB, Järfälla (SE)

(*) Notice: Subject to any disclaimer, the term of this patent is extended or adjusted under 35 U.S.C. 154(b) by 0 days.

(21) Appl. No.: 17/756,332

(22) PCT Filed: Nov. 23, 2020

(86) PCT No.: PCT/SE2020/000029
§ 371 (c)(1),
(2) Date: May 23, 2022

(87) PCT Pub. No.: WO2021/101426
PCT Pub. Date: May 27, 2021

(30) Foreign Application Priority Data

Nov. 21, 2019 (SE) .................... 1900199-9

(51) Int. Cl.
*G09G 5/00* (2006.01)
*G06F 3/0354* (2013.01)

(52) U.S. Cl.
CPC ...... *G06F 3/03547* (2013.01); *G06F 3/03548* (2013.01)

(58) Field of Classification Search
CPC .......................... G06F 3/03547; G06F 3/03548
See application file for complete search history.

(56) References Cited

U.S. PATENT DOCUMENTS

| | | | |
|---|---|---|---|
| 4,692,756 A | 9/1987 | Clark | |
| 5,270,690 A | 12/1993 | Oberg | |
| 5,874,940 A | 2/1999 | Rowe | |
| 2004/0049743 A1* | 3/2004 | Bogward | G06F 1/1626 715/262 |

(Continued)

FOREIGN PATENT DOCUMENTS

| | | |
|---|---|---|
| CN | 202815740 U | 3/2013 |
| DE | 4237844 C1 | 3/1994 |

(Continued)

OTHER PUBLICATIONS

International Search Report for International Application No. PCT/SE2020/000029, dated Mar. 12, 2021.

*Primary Examiner* — Joe H Cheng
(74) *Attorney, Agent, or Firm* — Mark T. Vogelbacker; Eckert Seamans Cherin & Mellott, LLC

(57) ABSTRACT

A flexible mat (2), optionally to be used for, but not limited to, a pointing device (1) arranged to control the movement of a pointer/cursor on a monitor/display at, for example, a computer or similar electronic device, can include a plurality of links (11a-z) arranged side by side and where these links are substantially rigid in their axial direction and mutually rotatable at a limited angle. The the links (11a-z) can include, or are made of, a substantially disc-shaped material or a foil, that at least one link (11a-z) is provided with a base portion (16a) extending in the longitudinal/axial direction of the link (11a-z), that the link the base portion (16a) of the link (11a-z), and that the coupling elements (15a-z) are integrated with or in the base portion of the link (16a).

15 Claims, 24 Drawing Sheets

(56) References Cited

U.S. PATENT DOCUMENTS

| | | |
|---|---|---|
| 2004/0169634 A1 | 9/2004 | Stroemberg |
| 2006/0279540 A1* | 12/2006 | Stromberg .......... G06F 3/03548 |
| | | 345/157 |
| 2010/0066671 A1 | 3/2010 | Stroemberg |
| 2015/0363014 A1 | 12/2015 | Wang |

FOREIGN PATENT DOCUMENTS

| | | |
|---|---|---|
| WO | 2005003949 A1 | 1/2005 |
| WO | 2014185847 A1 | 11/2014 |

* cited by examiner

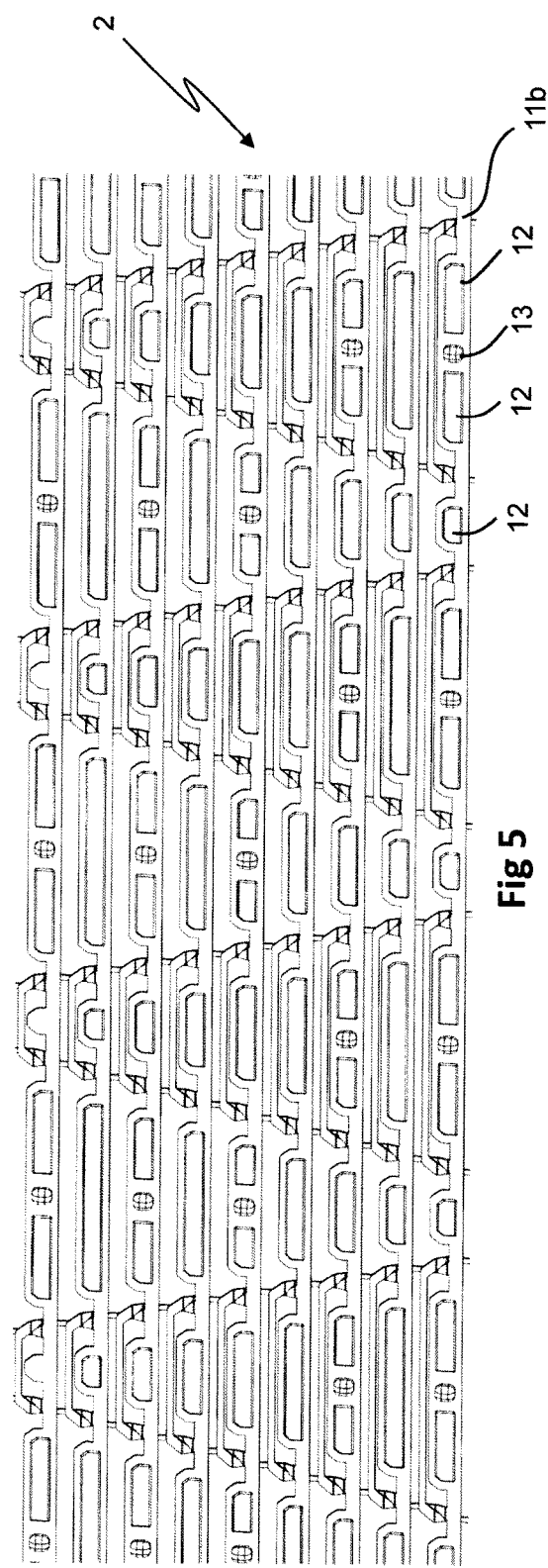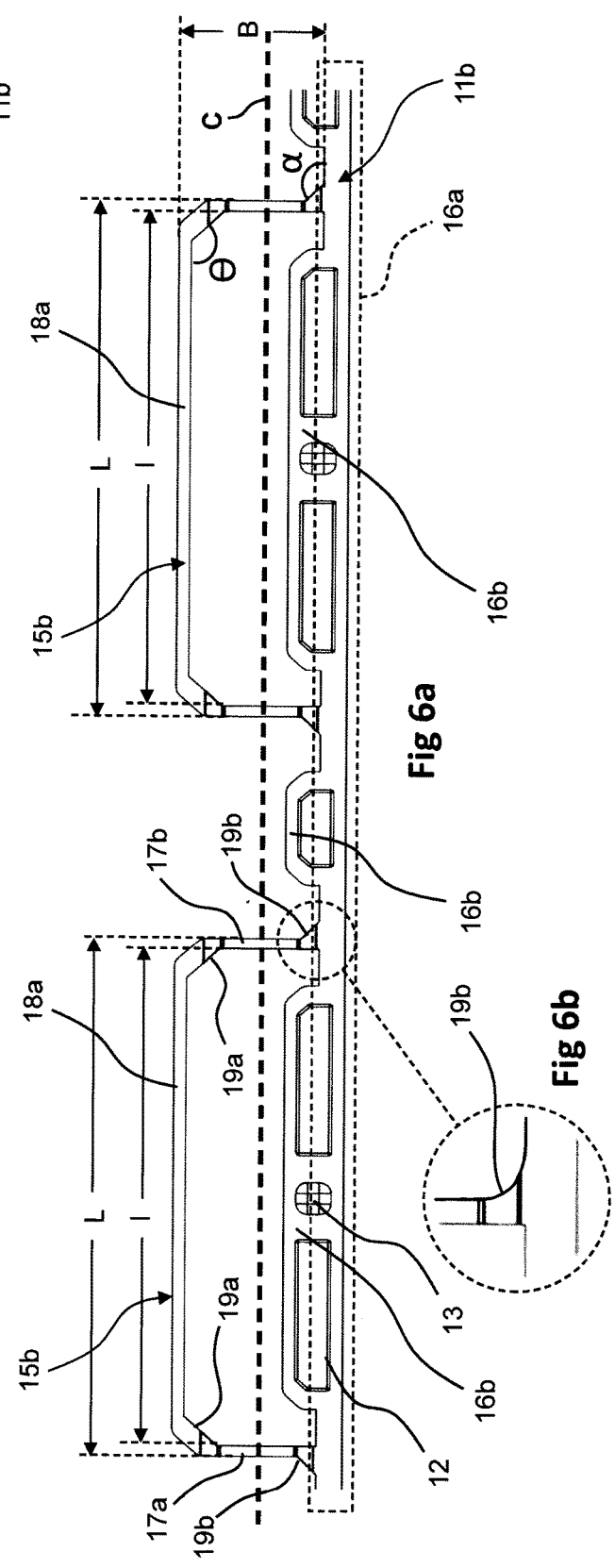

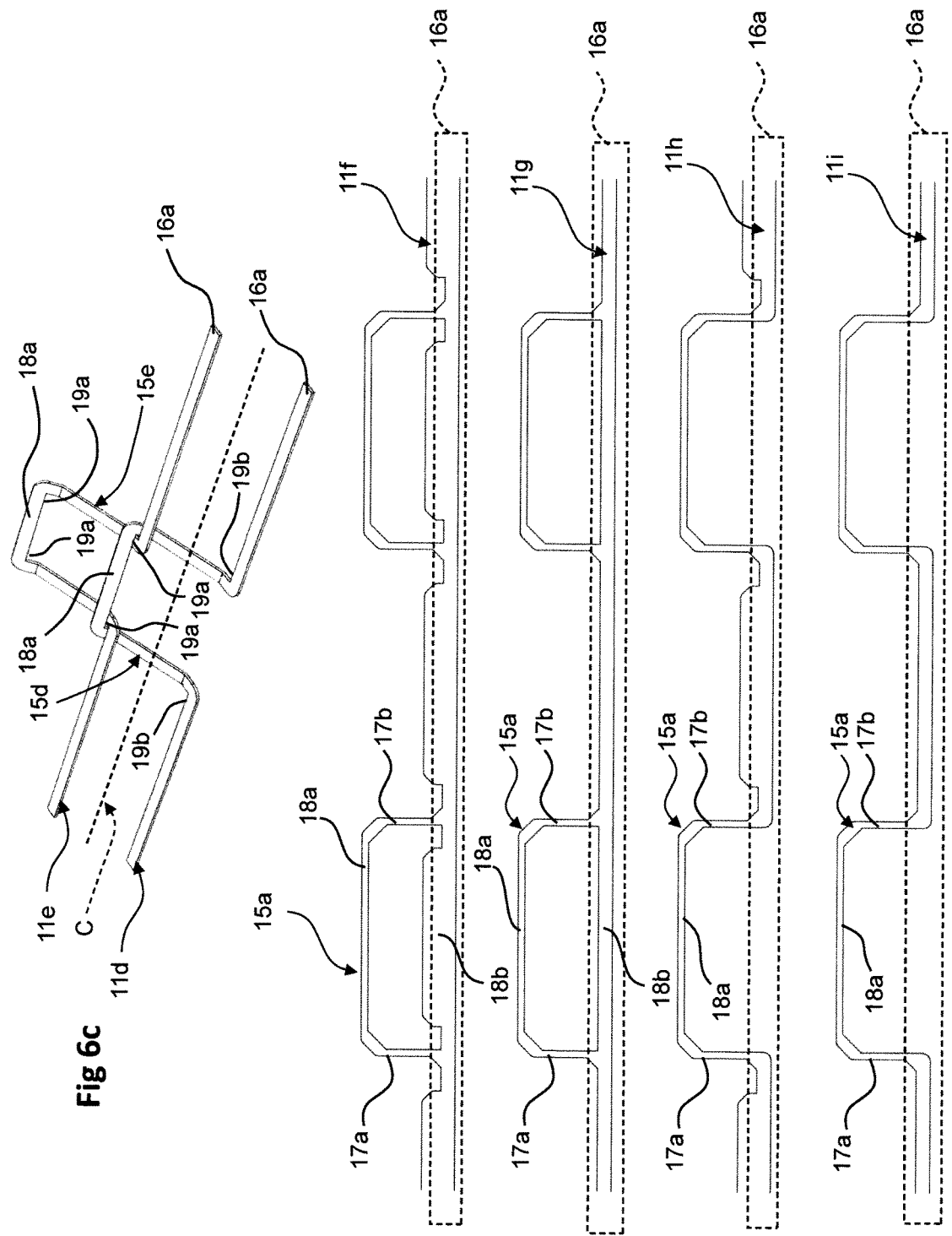

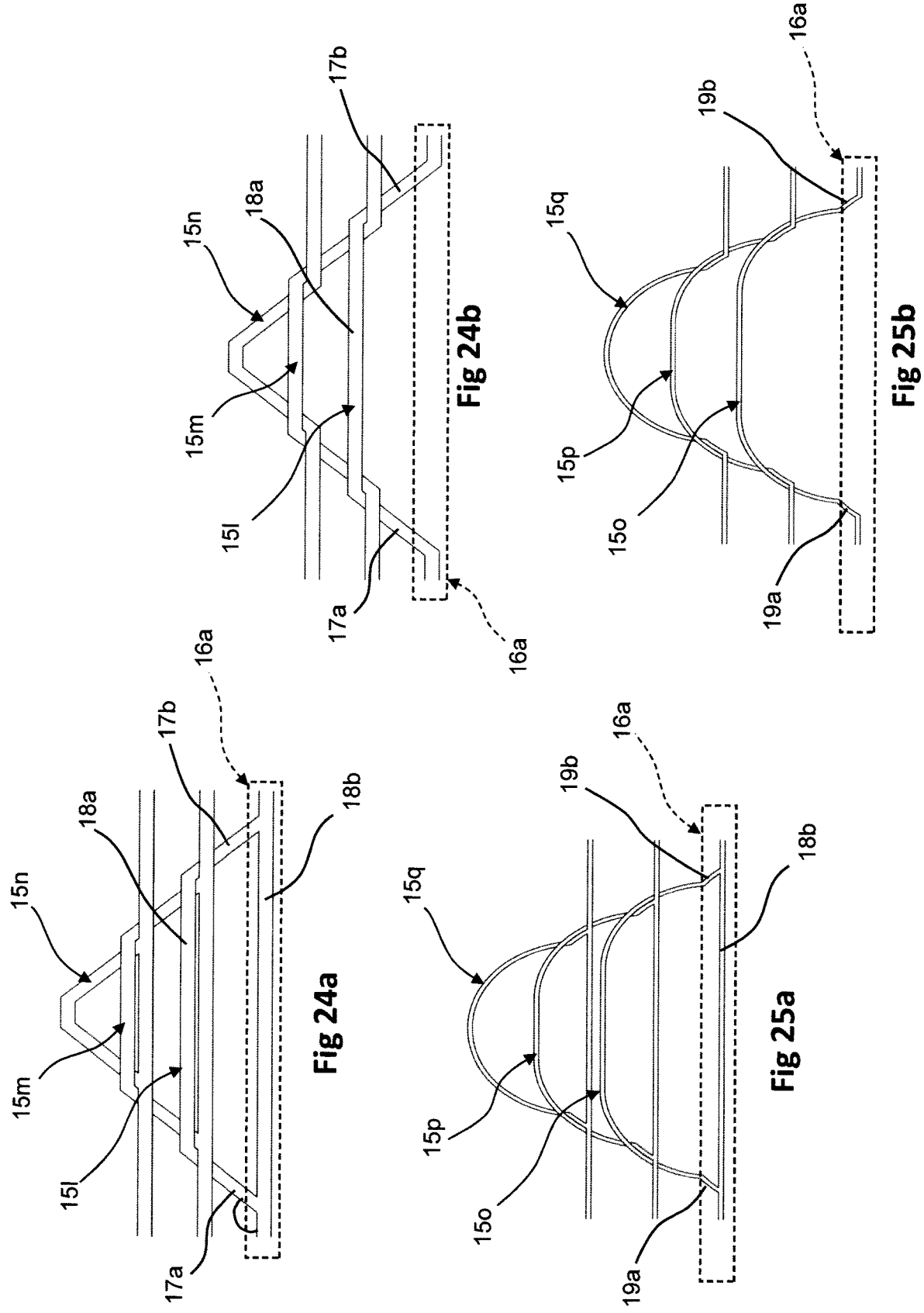

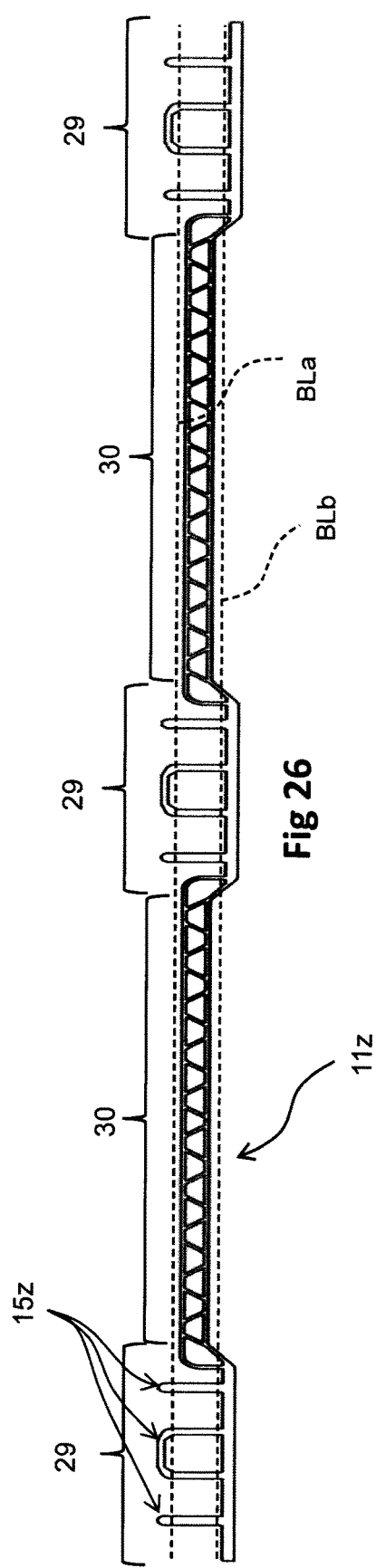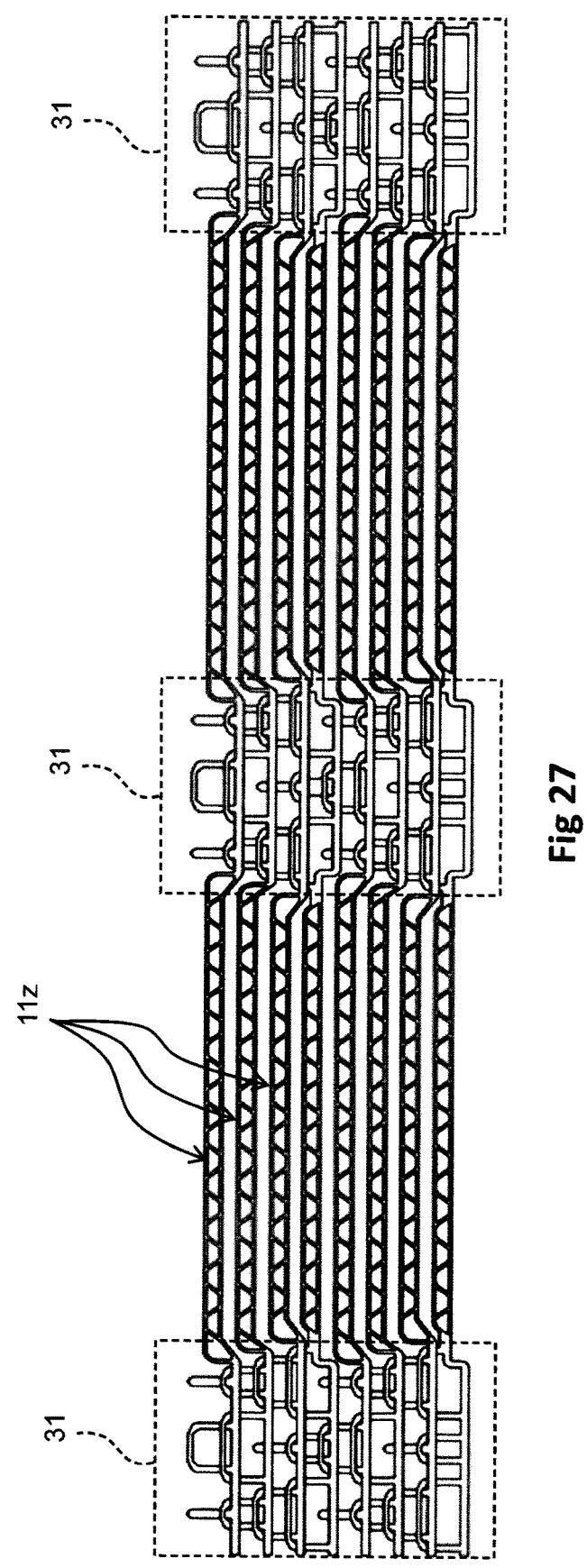

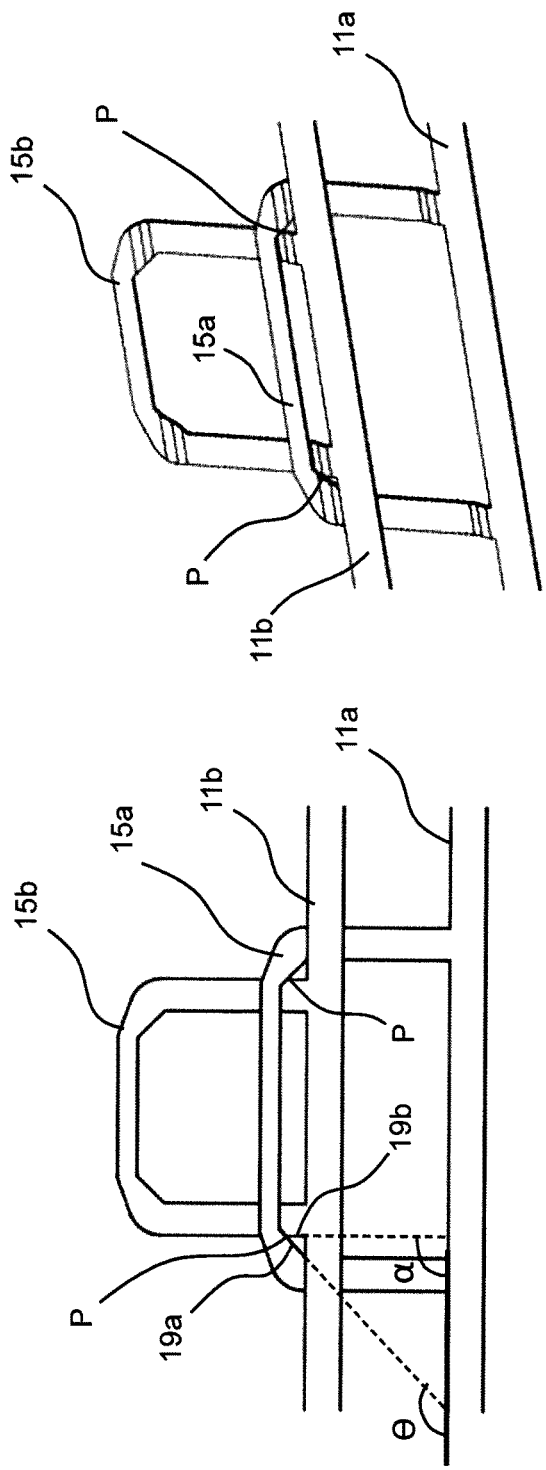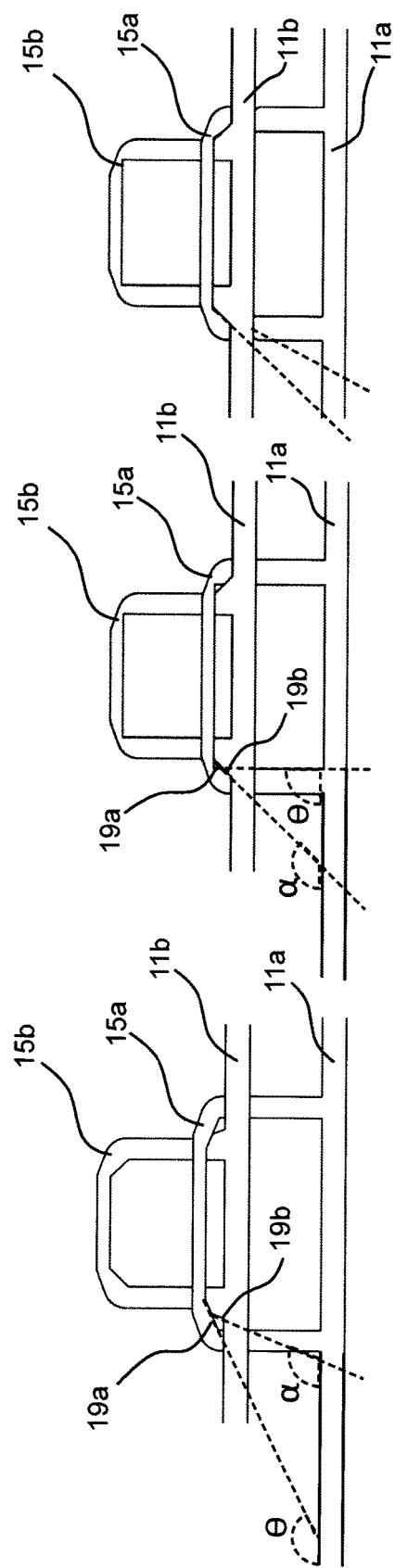

FLEXIBLE OR BENDABLE MAT, BAND OR CYLINDER

CROSS-REFERENCE TO RELATED APPLICATION

This application is a National Phase of International Application No. PCT/SE2020/000029, filed on Nov. 23, 2020, which claims priority to and the benefit of Sweden Patent Application No. 1900199-9, filed on Nov. 21, 2019, the disclosure of each which are incorporated herein by reference in their entirety.

TECHNICAL FIELD

The present invention relates to a flexible/bendable mat, band or cylinder comprising mutually turnable or rotatable links, preferably intended for use with, but not limited to, a pointing device arranged to control the movement of a pointer/marker/cursor on a monitor/display for e.g. a computer or similar electronic device, but also for use in other applications. The invention is particularly intended for enabling a pointing device so thin, with such a low construction height, that it is suitable for installation, for example in a laptop computer or similar device.

PRIOR ART

The normal and common pointing device today is the mouse which is dominant on the market for e.g. desktop computers. However, the mouse has a significant disadvantage, namely that the user has to move his hand from the keyboard and place it over the mouse in order to move the cursor on the monitor/display. The mouse is also directly unsuitable in cases where a work table is missing or if the space next to the computer is limited. Therefore, various alternatives to the mouse have been developed, of which the so-called touchpad is now integrated in virtually all laptop computers. The touchpad does not have the mentioned disadvantages but often gives a less precise movement of the cursor on the monitor/display due to the finger's contact surface against the touchpad, and not the actual movement of the finger, being detected. The fact that the finger must slide against the solid surface of the touchpad, with accompanying friction, is also often perceived as negative by the user. These disadvantages result in many laptop computer users not using the built-in touchpad but instead using a connected mouse where possible.

So called tablets have now gained great popularity and a wide market. Unfortunately, these devices do not have a physical keyboard, which means that work cannot always be performed efficiently with these devices. Therefore, many of these tablets offer an external keyboard, and an external mouse is also often used alongside this. Alternatively, the user must use the monitor's/display's "touch" function, which reduces efficiency, precision and ergonomics.

There are also pointing devices on the market that are placed between the user and the keyboard, designed with a rigid cylinder or rod rotatable and displaceable/translatable in one seat. Rotation of the cylinder moves the cursor vertically on the monitor/display and axial movement/translation of the cylinder (sideways) moves the cursor horizontally on the monitor/display. The advantage of pointing devices of this type is that the user only has to move the hand a short distance to reach the cylinder with the retained advantage that the response between the movement of the cylinder and the movement of the cursor on the monitor/display is as direct as in a conventional computer mouse. The cylinder can be easily moved, which results in good usability. A disadvantage of pointing devices of this type is that if the cylinder has a small diameter, the area that can be affected by the user also becomes small, which makes it difficult to effectively move the cursor for longer distances, especially in the vertical direction of the monitor/display. The larger the diameter of the cylinder, the larger the surface will be that the user can get in contact with, of course, but this is at the expense of the construction height of the pointing device becoming larger/higher. The consensus among ergonomists is that a pointing device of this type should be as thin as possible, which is made more difficult if the cylinder has a large diameter. The trend is also towards thinner keyboards, and the height of a pointing device of said type, which is placed next to a thin keyboard, should not be significantly higher than the height of the keyboard in order to achieve a comfortable working situation for the user.

A pointing device described, for example, in SE0201694-7 is currently on the market, which is also placed between the user and the keyboard. The pointing device comprises an axially rigid but tangentially easily bendable cylinder which encloses a flat elongated relatively thin plate or beam, arranged so that its upper surface is parallel to the base on which the pointing device is placed. The upwardly directed surface of the cylinder can be reached and moved in two dimensions by the user, substantially parallel to the upper support surface of the beam, through an opening in the housing of the pointing device, on its upper side. This is achieved in that the cylinder is translatable arranged in its axial direction between end stops, and rotatable around the beam in all axial positions by means of two co-rotating rollers. The movement of the cylinder is detected optoelectronicaily, whereby e.g. a cursor is caused to move correspondingly on a display. The main advantage of this technology is that the pointing device can be manufactured with a significantly lower construction height than competing pointing devices with a comparable operating opening, built with a rigid cylinder or rod. Despite this, there are problems that limit how low the construction height of a pointing device with this technology can be designed/manufactured with.

One problem is that the cylinder is made up of a thin weave/web, such as a thin fabric, which, although extremely flexible, can hardly be used in combination with rolls with a diameter of less than 6 mm. This is because the fabric has a "memory effect"; if the pointing device is left unused for a while, the parts of the fabric which are in a curved/bent state around the rollers tend to form more permanently in this curved state. If a user then wishes to move the cursor on the monitor/display vertically a short distance (i.e. the cylinder rotates slightly over the beam) and then releases the cylinder, the cylinder risks rotating back to its previous "rest position" or original position, which then moves the cursor on the monitor/display in an unacceptable manner. The impact of this memory effect increases with decreasing diameter of the rollers.

The part of the cylinder which is below the beam also needs to hang down a few millimeters, in order to reduce the tangential tension of the cylinder and thereby reduce the friction to a value which allows comfortable movement of the cylinder. This has further increased the thickness of the pointing device.

On the inside of a finished cylinder are thin strings of hard glue. On the outside of the cylinder are thin strings of silicone rubber. Manufacturing has started with a cut piece of fabric, glue has been applied in the form of strings on one side of the fabric and hardened to a hard condition, then silicone rubber has been applied in strings on the other side of the piece of fabric and hardened, whereby the cylinder has been closed via a narrow so-called overlapping joint, also using hardened adhesives. All this has proved to be very difficult and expensive to achieve in production. The rejection rate has been high.

Also according to WO2014/185847, a type of cylinder consisting of longitudinal link rods which are slidably mounted relative to each other via special links has been proposed. Such a cylinder has no memory effect but cannot be manufactured rationally due to its complexity, and the cylinder necessarily becomes so heavy that it becomes difficult for the user to maneuver, due to the longitudinal link rods having to be made thick, in order to attach and integrate the intermediate links and bearing pins used to connect the link rods to each other. The thickness of the link rods and their necessary width also prevent installation in thin pointing devices.

Prior art is thus drawn with the problem that not sufficiently thin mats/cylinders can be manufactured to e.g. be suitable to be built into and used in future electronic units with low construction height, such as e.g. laptop computers or stand-alone pointing devices adapted for thin keyboards, and which also do not have a mechanically "memory effect". The thinnest constructions of mats/cylinders that exist today, based e.g. on a mat of fabric, are also difficult to manufacture rationally and gives high rejection rate which makes them costly to manufacture.

Prior art thus does not show or describe any practically/economically useful construction of a tangentially bendable cylinder which is suitable for installation in, for example, small computers or similar units.

THE OBJECT OF THE INVENTION AND THE MOST IMPORTANT FEATURES

An object of the present invention is to solve the above-mentioned problems of the prior art and to demonstrate a device comprising a mat or band made of thin axially relatively rigid links which are mounted together so that a band or an endless loop or cylinder is formed and where the links at least to some extent are rotatable or turnable relative to each other.

A further object of the invention is that the mat/cylinder should have a sufficiently large axial stiffness so that it does not deform or collapse, e.g. when it has reached an end stop in the pointing device and the user tries to move the cylinder further in the same direction.

A further object of the invention is that the play between adjacent links is to be eliminated so that even small movements of the part of the mat/cylinder which is operated manually in the operating opening are conveyed to the part of the cylinder where its movement is detected.

A further object of the invention is that the mat/cylinder should provide minimal tangential rigidity without memory effect so that the mat/cylinder can easily rotate around the beam and remain in the achieved, and in the user desired, position when the user releases the manual contact with the mat/cylinder.

A further object of the invention is that the mat/cylinder should be sufficiently mechanically durable so that it is not deformed plastically, e.g. when the user forcefully strives to separate two or more fingers that are in contact with the mat/cylinder.

A further object of the invention is that the friction between the user's finger(s) and the upper surface of the mat/cylinder should substantially exceed the friction between the mat/cylinder and the beam, so that the mat/cylinder can be easily moved by the user.

A further object of the invention is that the mat/cylinder should be possible to be made with low weight, which minimizes friction that needs to be overcome when the user moves the mat/cylinder.

A further object is to reduce remaining friction in the construction that needs to be overcome for the movement of the mat/cylinder.

A further object of the invention is that the construction height of the cylinder, i.e. the distance between the top and bottom of the cylinder in mounted and active position, should be so low that installation in, for example, laptop computers or keyboard accessories adapted for laptop computers, touchpads or similar devices becomes suitable.

A further object of the invention is to achieve minimal friction between the links during the mutual rotation of the links, which is achieved by the links contacting each other in substantially point-shaped contact surfaces.

A further object of the invention is that pointing devices with a mat/cylinder of the construction according to the invention should in principle be simple and thus cost-effective to manufacture.

A further object of the invention is that pointing devices with a cylinder of the construction according to the invention should also be able to function as an accessory for computers, touch pads and similar units existing on the market.

A further object of the invention is to demonstrate an arbitrarily long mat or flexible band which can be used e.g. in jalousies or similar.

A mat/cylinder according to the present invention should also be able to be used, for example, as a conveyor belt, drive belt, caterpillar feet, bogie belt or the like.

The present invention eliminates the disadvantages of prior art. The memory effect of the mat/cylinder is eliminated, the risk of deformation of the mat/cylinder during operation is reduced/eliminated so that every mechanical movement in the mat/cylinder is detected with the least possible distortion/distortion, low construction height of the pointing device can be achieved etc.

BRIEF DESCRIPTION OF THE INVENTION

The invention thus relates to a flexible mat or a band, preferably shaped as a cylinder and primarily intended for use in a pointing device for controlling a cursor on a monitor/display at a computer or similar device.

The invention is mainly characterized in that a link is made of a material of substantially uniform thickness, such as e.g. of a substantially flat or disc-shaped material or a foil, that the link comprises coupling elements with joint- or contact edges directed towards the imaginary center line of the link, that the contact edges may be oriented parallel to the imaginary center line of the link, or oriented at an angle relative to the center line of the link; said contact edges are arranged to form bearing points between adjacent links when the mat is stretched in its longitudinal direction, and that the link and/or coupling element is bent along at least one bending line preferably arranged between the imaginary center line of the link and the coupling elements bearing points, and where said bending line extends substantially parallel to the center line.

The invention is also characterized in that the link is provided with a base portion 16a extending in the longitudinal/axial direction of the link, that at least one, preferably a number, coupling elements are arranged in or at the base portion of the link, that at least one of a link coupling elements is arranged in the form of a hollow-shaped recess, for example forming an arc/U-bracket/loop or the like, that at least one of a coupling element of a link is mechanically coupled to a coupling element of an adjacent link, in that the coupling element of the link is at least partially inserted into or through the coupling element of the adjacent link, whereby adjacent links in the mat remain mutually rotatable or turnable a limited angle relative to each other when the mat is stretched in its longitudinal direction.

The invention is further characterized in that the link or its coupling element is NOT made of a wire-shaped material/ goods, ie does not consist of a substantially round wire of metal. Making the mat from wire-shaped goods/material would result in a substantially thicker mat, compared to a mat made from a substantially plate- or foil-shaped material, which would counteract the object of the invention. There are other problems as well. However, special problems arise when producing one at the same time rigid but also flexible mat/cylinder from a very thin material/material. However, this is solved by the present invention.

The mat is preferably arranged to form an endless loop or cylinder and is thus made up of a number of mutually rotatable or turnable, axially substantially rigid links, and encloses and rests against some form of support element, e.g. a mainly flat beam. At least a part of the cylinder, the upper part of the cylinder, rests against some support, such as the upper side of the beam, the support surface, which is typically arranged parallel to the basis on which the pointing device is in turn placed. The upper side of the cylinder is arranged to be at least partially exposed upwards in an operating opening in the cover of the pointing device, so that the cylinder can be conveniently moved in relation to the surface of the beam by a user. The cylinder can thus be displaced in its axial direction but also rotated about its imaginary center line. The movements of the cylinder are detected by means of, for example, an optical detector, which in turn generates an electrical signal which gives rise to the movement of, for example, a cursor on a monitor/ display. The invention is particularly directed to the design of the cylinder, its links and their assembly. The axial length of the cylinder is preferably equal to or greater than its circumference.

Optionally, two rods can be arranged to rotate and slide axially on their respective shafts or rods, located at both edges of the beam and the cylinder in this case also encloses these rods and shafts.

The cylinder is made up of links which, when the cylinder is stretched, are in mechanical contact with each other in substantially point-shaped contact surfaces. The links are thus mutually rotatable or turnable at a limited angle relative to each other.

The links preferably consist of a goods/material of substantially uniform thickness and are, for example, etched or punched from this thin goods/material which may suitably be a foil, for example a metal foil such as a steel foil. However, other materials are also possible to use, such as e.g. plastics, ceramics, fiberglass, carbon fiber or similar. The material typically has a thickness of up to about 1 mm, but preferably has a thickness of 0.025-0.3 mm. A thin foil helps to reduce the thickness of the pointing device and can be etched at low cost. The weight of the cylinder is thus minimized, which contributes to low contact force during use, which in turn provides low friction and thus the cylinder can be easily moved by a user. Furthermore, very advanced shapes can be produced by etching from a foil, which enables a far-reaching optimization of assembly and function.

The links can be said to have a base portion, to which a number of coupling elements are arranged. The coupling elements are preferably all arranged along one long side of the base portion of each link. However, a middle link is provided with coupling elements along both long sides of the base portion. Each coupling element suitably consists of two side legs connected to the base portion and substantially perpendicular to the axial extension of the base portion, which legs are connected at their other outer, directed from the base portion, ends via a beam. The coupling elements on the various links in the mat are arranged at the corresponding location, in the corresponding axial position, on each link in the mat to enable the links to be mechanically connected to each other by means of the coupling elements. However, the coupling elements at respective locations on adjacent links preferably have different lengths, in order to enable adjacent links to be effectively connected and pushed/shifted into each other. The area of the coupling elements where the mechanical contact between the links occurs, forms a cross seen in the end view of the links.

Further features and advantages of the invention will become apparent from the following, more detailed description of the invention, and from the accompanying drawings and claims.

BRIEF DESCRIPTION OF THE DRAWINGS

The invention is described in more detail below in the form of some preferred embodiments and with reference to the accompanying drawings.

FIG. 5 shows an example of how low and high friction elements can be located on the links in a mat.

FIG. 6a shows a link comprising a base portion which along its one side is provided with a number of substantially U-shaped coupling elements with an outer length L, an inner length I and a width B, FIG. 6b shows in more detail how a contact edge can be formed arcuate, FIG. 6c shows an alternative design of links without inclined contact edges and FIG. 6d finally shows some different conceivable constructions of a base portion of a link and the coupling elements of these links.

FIGS. 24a and b show another design of coupling elements provided with inclined side legs.

FIGS. 25a and b show a further design of coupling elements where three arcuate or U-shaped coupling elements are connected to each other in a corresponding manner as in FIGS. 23a, b.

FIG. 26 shows a link according to the invention with a still another embodiment, where the coupling elements of the link are arranged in groups at a distance from each other along one side of the link.

FIG. 27 shows eight links according to FIG. 26 connected together forming a mat where the coupling elements form coupling element areas.

FIGS. 28a and b show partial views of two links according to FIG. 26 and more particularly the design of two coupling elements each belonging to one of the two links connected. The design of the contact edges is especially noticeable here.

FIGS. 29a to c each show partial views of two interconnected links and more specifically different possible designs of the contact edges of the coupling elements.

DESCRIPTION OF PREFERRED EMBODIMENTS

Figure 1:
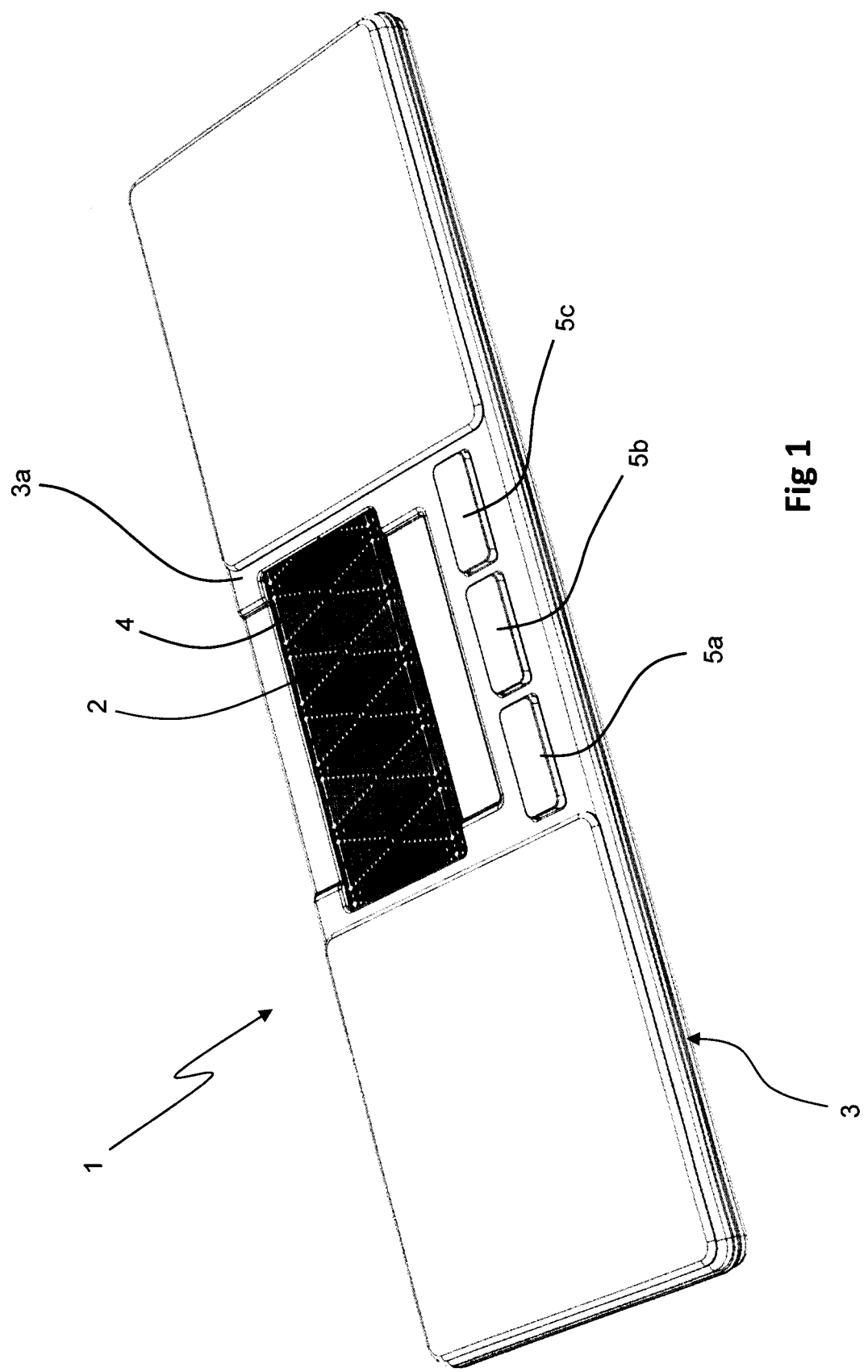
FIG. 1 shows a perspective view of a pointing device intended to be located in front of a keyboard.

FIG. 1 shows a perspective view of a pointing device 1 intended to be located between a user and a common keyboard, not shown. The pointing device 1 is provided with a flexible/bendable mat 2 according to the invention, formed into a cylinder. In the upper housing part 3a of the pointing device 1, an upwardly directed opening towards the user, a so-called operating opening 4 is arranged, which exposes at least a part of the upwardly directed surface of the mat/cylinder 2, the upper side of the mat 2. A user can with one or more fingers reach the top of the cylinder and move the mat/cylinder 2 optionally in two directions/dimensions, laterally and transversely relative to the pointing device 1. The pointing device 1 suitably has buttons 5a-c for further functions not further specified here.

Figure 2:
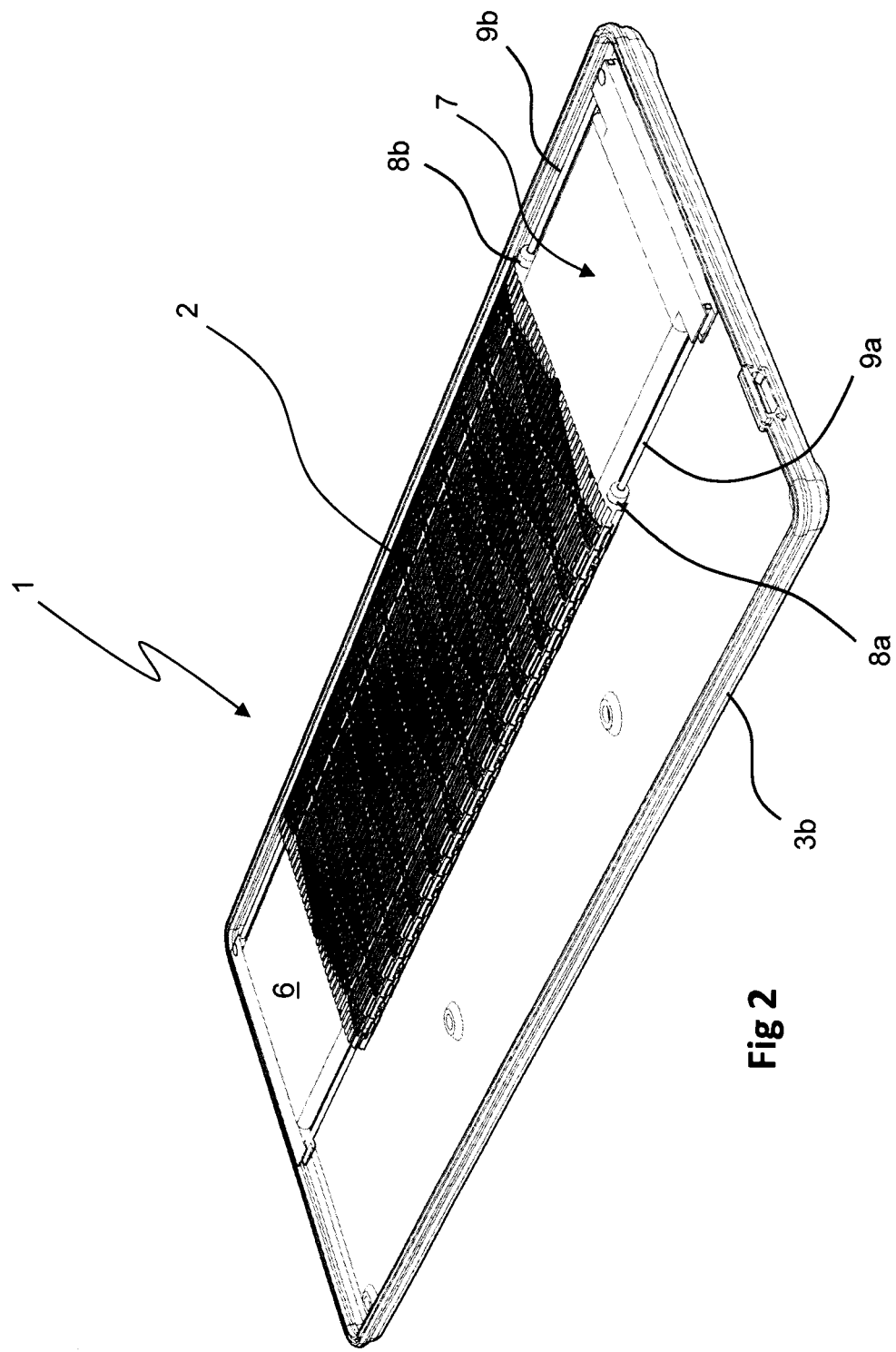
FIG. 2 shows a perspective view of the pointing device with the upper part of the housing removed.

FIG. 2 shows a perspective view of the pointing device 1 with the upper part of the housing (not shown) removed. The mat 2, here more clearly shaped as a cylinder, consists of a number of thin and elongate links which are rotatably connected to each other. The mat/cylinder 2 encloses a preferably flat and rectangular shaped plate or beam 6. The length of the cylinder is typically greater than half its circumference. The upper part of the cylinder rests against the substantially flat upper side of the beam 6, its support surface 7. The cylinder is here tangentially tensioned over the beam 6 and in this case over two rods 8a,b located along the long sides of the beam 6, each of which is arranged to rotate around, and slide axially on, each its rod 9a,b. It is also possible to use only one rod (not shown) placed along one of the long sides of the beam 6 whereby the cylinder will rotate directly towards the edge of the beam 6 on its opposite side.

Figure 3:
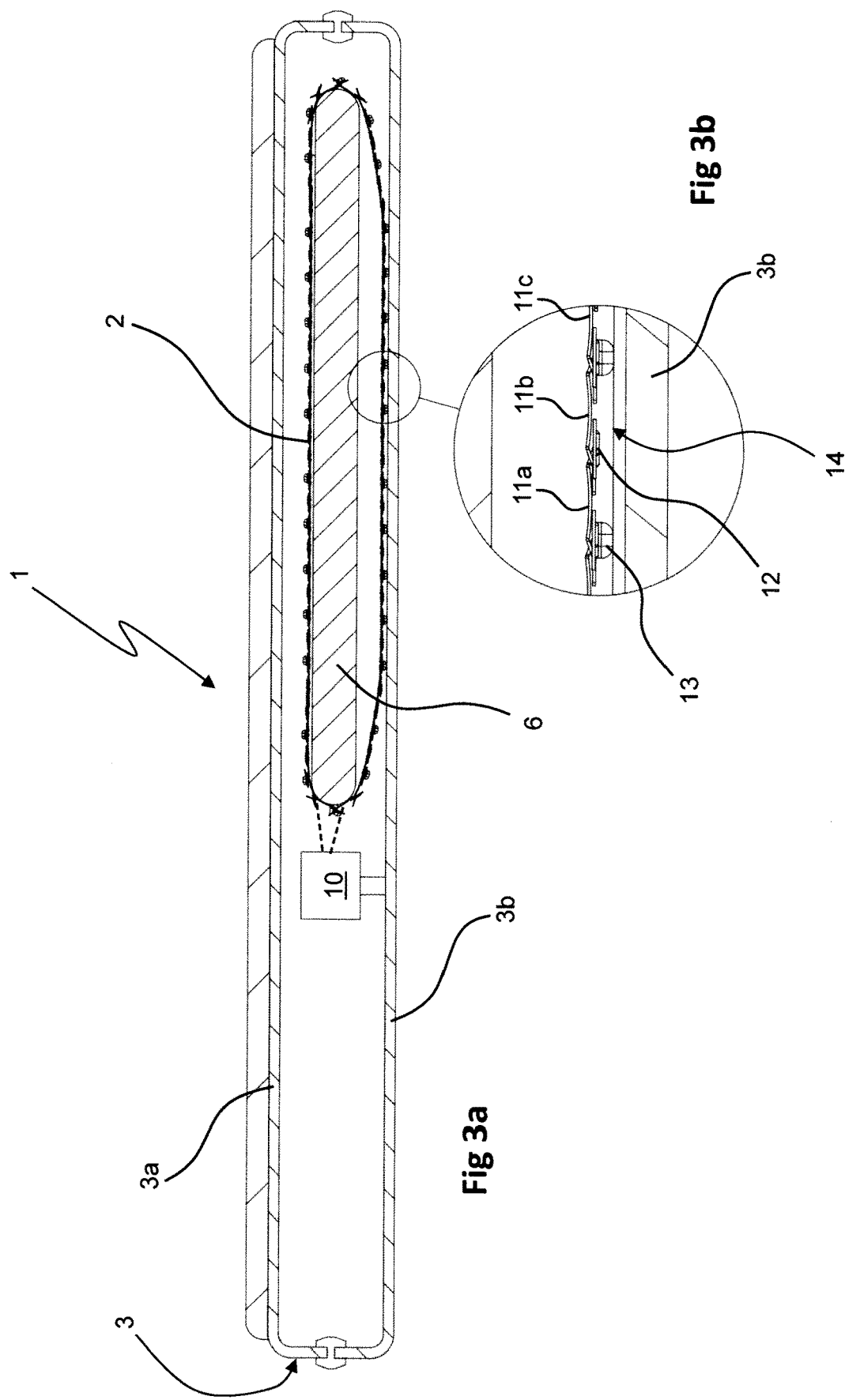
FIGS. 3a and b show in a section across the housing of the pointing device, an end view of the upper and lower part of the housing and the cylinder and beam around which the cylinder rotates, and an enlargement of a part of the cylinder.

When the user manually moves the cylinder, i.e. rotates or displaces the mat 2 in axial direction or performs a combination of these movements, the movement of the mat/cylinder 2 is detected by a sensor 10 schematically shown in FIG. 3 and information about the movement/shifting is transmitted in the form of a signal to, for example, a connected computer (not shown), resulting in e.g. that a cursor moves in the same way as the cylinder but on the monitor of the computer. The sideways movement of the cylinder, ie in its axial direction, thus suitably gives rise to a horizontal movement of the cursor on the monitor and rotation of the cylinder gives rise to a vertical movement of the cursor on the monitor. Diagonal movements of the cursor are a combination of said movements of the cylinder and the cursor can thus be moved in all conceivable directions on the screen.

FIG. 3a shows, in a section trough the housing 3 of the pointing device 1, an end view of the upper 3a and lower 3b part of the housing and the mat/cylinder 2 and the beam 6 around which the mat/cylinder 2 rotates. Here the cylinder is shown rotating only around the beam 6 and its edges without the use of rods 8a,b. This normally requires that the beam 6 be made of, or coated with, a material which provides sufficiently low friction against the mat/cylinder 2. The cylinder is kept sufficiently tangentially stretched by suitable selection of the width of the beam 6 in relation to the circumference of the cylinder. Sensor 10, e.g. an optical type sensor, is arranged to detect the movements of the mat/cylinder 2.

FIG. 3b shows in more detail a part of the mat/cylinder 2, here directed downwards in the figure. The mat/cylinder 2 is composed of a number of links 11a-c (see also FIG. 4), the construction of which is discussed in detail in the following.

High friction elements 12 are arranged on the upper/outer surface of the links 11a-c (i.e. the surface of the mat facing outwards relative to the center of the cylinder) to facilitate the user's operation of the pointing device 1, and low friction elements 13, also located on the links 11a-c outer surfaces, are arranged to reduce the friction between the mat/cylinder 2 and the inner/lower bottom surface 14 of the pointing device. The bottom surface 14 can as an alternative, and with the purpose to reduce the friction, of course be provided with a surface for example a plate covered with, or consisting of, a material which provides low friction and low wear against the low friction elements 13. It is a great advantage that the mat/cylinder 2 is only so tensioned around the beam 6 in the tangential direction of the cylinder that it hangs slightly below the beam 6 and drags slightly against the inner bottom surface 14 of the housing 3. Thereby is the tangential tension of the mat/cylinder 2 minimized, which in turn minimizes the contact force of the mat/cylinder 2 against the edges of the beam 6, meaning that the friction of the mat/cylinder 2 towards the edges of the beam 6 is minimized, which significantly facilitates the user's movement of the mat/cylinder 2 and increases the user's comfort.

The longitudinal direction of the mat/cylinder 2 is defined here as the direction across the axial extent of the links. The "axial length" of the cylinder, on the other hand, is defined as the length seen in the axial direction of the cylinder.

Figure 4:
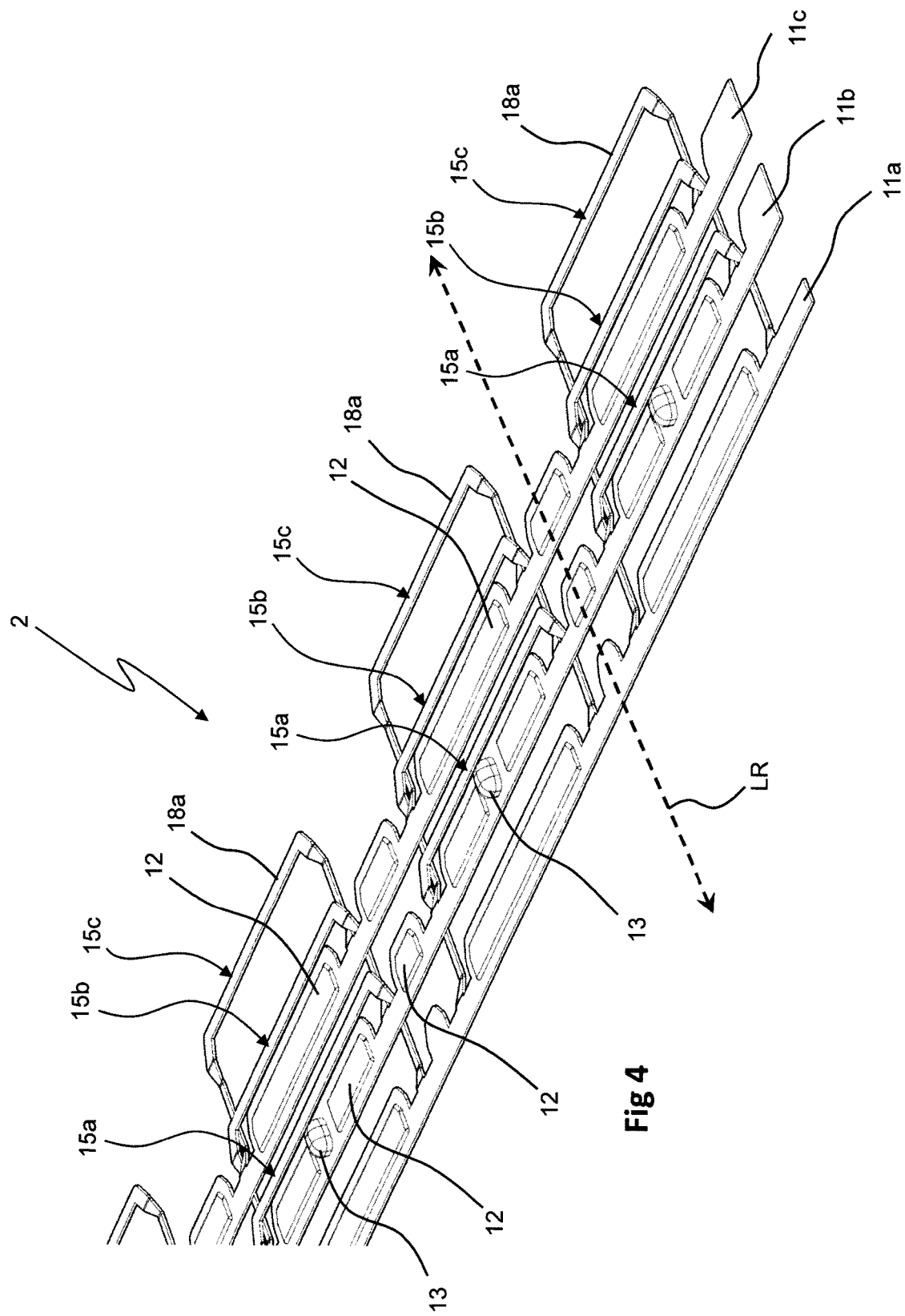
FIG. 4 shows a perspective view of three adjacent and interconnected links where it is shown how the coupling elements can be designed.

FIG. 4 shows a perspective view obliquely from above of three adjacent and interconnected links 11a-c each provided with a plurality of coupling elements 15a-c. The coupling elements 15a-c are arranged with different lengths to enable/facilitate the assembly of the mat 2. During assembly of a mat 2, a coupling element 15b of a second link 11b is simply pushed into a coupling element 15a of a first link 11a, after which a coupling element 15c of a third link 11c is pushed into the coupling element 15b of the second link 11b, etc. For each mounted link 11a-b, the length of the mat 2 increases and the longitudinal direction LR of the mat 2 is indicated by the bidirectional dashed arrow LR in FIG. 4.

After assembly, the coupling element 15c can be said to be located in, be inserted through, the coupling element 15b, which in a corresponding manner can be said to be located inside the coupling element 15a. Each of the links 11a-z and the respective coupling elements 15a-z of the link can advantageously be made of one and the same substantially flat-shaped or foil-shaped goods/material. FIG. 4 also shows some examples of the high-friction elements 12 and the low-friction elements 13 arranged on the links 11a-c. These partially cover the outer surface of the link 11a-c.

The links 11a-c are made of a thin flat formed goods/material, preferably a foil, and preferably a metal foil whose thickness is advantageously 0.02-0.30 mm, whereby the total weight of the mat/cylinder 2 can be kept low, typically 10 grams or less. This facilitates the movement of the cylinder as the friction in the pointing device/system is minimized. The material of the links 11a-c can of course be both thicker and thinner, depending on application, material stiffness and other circumstances.

The links 11a-c can advantageously be etched out of a thin steel foil. The etching can be done in a cost-effective way as the material is thin. A high precision can also be achieved as well as links 11a-c that are stress-free and free from sharpness can be obtained without other further processing.

Alternatively, fine cutting, laser cutting or 3D printing can be used to produce the links 11a-c according to the invention.

In addition to metal, the links 11a-c may be made of a material from the group: plastic, fiberglass, carbon fiber, a ceramic material or other materials with similar properties.

The links 11a-c are coated on as large an area as possible with high-friction elements 12, consisting of a substantially soft material, as a mat/cylinder 2 of metal links without arranged high friction elements 12 can be perceived as too slippery and thus difficult to operate by a user. The high friction elements 12, which solve this problem, are suitably arranged wholly or partly on the outer surfaces of the links 11a-c with a thickness of about 0.1 mm, but can of course be designed with a different thickness and advantageously consist of a silicone rubber or other material with similar properties.

The links 11a-c of the mat/cylinder 2 are also here and there provided with low-friction elements 13 arranged in the form of small "islands" or "drops", which extend a few tenths of a mm more outwards than the affixed high-friction elements 12, counted from the links 11a-c surfaces. The diameter of the low-friction elements 13 is suitably about 1 mm. The low friction elements 13 are intended to come into contact with the bottom surface 14 of the lower housing part 3b of the pointing device (see in particular FIG. 3b), or a surface specially arranged separately on or near the bottom of the pointing device 1 which preferably gives low friction against the low friction elements 13.

Provided that the low friction elements 13 are not located too sparsely on the links 11a-c , the high friction elements 12 will never reach down to the bottom surface 14 of the pointing device and create an unfavorable increased friction. Because the low-friction elements 13 consist of a hard and smooth material such as acrylic plastic or the like, the friction of the mat/cylinder 2 against the bottom 14 of the pointing device is minimized, whereby the mat/cylinder 2 becomes easily movable. The low friction elements 13 are small and relatively few so the user's fingertips will always easily reach down to the high friction elements 12, via the operating opening 4, which gives the user a good grip on the mat/cylinder 2.

Without low friction elements 13, the high friction elements 12 would contact the inner bottom surface 14 of the pointing device, resulting in greatly increased friction in the movements of the mat/cylinder 2 which would significantly impede the user's movement of the mat/cylinder 2.

FIG. 5 shows an example of how the low-friction elements 13 can be located on some of the links in a mat/cylinder 2. The link 11b is e.g. thus arranged with partly high-friction elements 12 but also with low-friction elements 13.

Low-friction element 13, such as small bulges, tongues or bumps can also be formed/pressed from the link 11b's own material (not shown), which then works as low-friction elements 13. The advantage is that no additional material need to be added.

Yet another option is that small balls, discs or the like of a relatively hard material, are applied to the link 11b. How the low friction elements 13 are constructed, or of what material they are made of is not decisive, the essential thing according to the present invention is that low friction elements 13, consisting of a harder or at least more low friction material than the high friction elements, reach further out, higher up, from the outer surface of the link than surrounding high friction elements 12.

An alternative to arranging low-friction elements 13 resting on the bottom surface of the pointing device is to stretch the mat/cylinder 2 via the edges of the beam 6, or via rods 8 so much that it hangs down very little, minimally, from the underside of the beam 6 and therefore does not reach down to the inner bottom surface 14 of the pointing device 14. This enables a relatively low (thin) pointing device 1 but increases, due to the In this case inevitably high tangential tension of the mat/cylinder 2, the friction of the mat/cylinder 2 against the edges of the beam 6, or the friction of the rods 8 against the axles 9 on which they slide and rotate, which would significantly impede the user's movement of the mat/cylinder 2.

Another alternative is to let the mat/cylinder 2 hang down a considerable distance under the beam 6, which admittedly enables a good gliding/rotation of the mat/cylinder 2 around the beam 6, but at the same time requires a larger distance between the underside of the beam 6 and the bottom surface 14 of the pointing device 1. This significantly increases the construction height (thickness) of the pointing device 1, which is not desirable.

The problem is thus to design a pointing device 1 with a low construction height at the same time as the mat/cylinder 2 must be easily rotatable around the beam 6. High friction elements 12 arranged on large surfaces of the links 11$a$-$c$ and small low friction elements 13 arranged at selected places of the links surfaces are a prerequisite for solving this problem.

FIG. 6$a$ shows the link 11$b$, from FIG. 5, consisting of a base portion 16$a$, the portion in the figure which is within the dashed region and which constitutes the most rigid part in the longitudinal direction. The link 11$b$ is provided along its one long side with a number of substantially U-shaped coupling elements 15$b$, with an outer length L and an inner length I.

Even if the base portion 16$a$ of the link and the coupling elements 15$a,b$ are made of different materials, the coupling elements 15$a,b$ are advantageously fixedly arranged to the base portion 16$a$ of the link, whereby an integrated unit is obtained. Due to the simple construction of the coupling elements 15$a,b$, no moving parts are needed in the link 11$b$ or between links to achieve a hinge function and allow the links to be rotated/turn relative to each other. The coupling elements 15$a,b$ and the base portion 16$a$ of the link thus form a fixed and very thin integrated unit.

Each coupling element 15$b$ extends from the base portion of the link 11$b$ with a width B. The coupling elements 15$b$ are thus arranged on one long side of the link 11$b$ while the other long side lacks coupling elements. Each coupling element 15$b$ is formed with a recess and can be said to form a "loop" comprising side legs 17$a,b$, which are thus fastened/arranged in or at the base portion 16$a$ of the link 11$b$. The side legs 17$a,b$ are connected to each other at their other ends via a connecting beam 18$a$. These connecting beams 18$a$ are arranged substantially parallel to the imaginary center line C of the link 11$b$ which extends parallel to the length of the link, and is located midway between the long sides of the link.

The base portion 16$a$ may be provided with a widened surface 16$b$, along parts of the base portion 16$a$ of the link, e.g. between two coupling elements 15$a$-$q$, and which can extend into the inner space/recess of the coupling element, in order to increase the surface which can be coated with high-friction elements 12 and/or low-friction elements 13. The side legs 17$a,b$ are here arranged at a substantially right angle to the links 11$a$-$c$ center line C, but can of course be arranged at a different angle.

The outer and inner length of the coupling elements 15$b$, L resp. I, is defined below as follows:

The outer length L of a coupling element 15$b$ is the largest distance between the outer edges of the side legs 17$a,b$ which can be measured along a line parallel to the axial extension of the link, or its center line C.

The inner length I of a coupling element 15$b$ is the largest distance between the inner edges of the side legs 17$a,b$ which can be measured along a line parallel to the center line C of the link.

These definitions also apply to side legs with an irregular design, as described below.

The coupling elements 15$b$ are provided with angled contact or hinge edges 19$a,b$ arranged to create bearing points P between adjacent and interconnected links 11$a,b$ (see for example FIGS. 8$b$ and $c$) in order to achieve substantially free-slip and play-free rotation/rotation of the links 11$a,b$ in relation to each other, when the mat 2 is stretched in its longitudinal direction. Such angled inner contact or hinge edges 19$a$ are arranged i.a. at the connection of the side legs 17$a,b$ to the connecting beam 18$a$, and more specifically on the insides of the corners formed there. Correspondingly, the side leg 17$a,b$, is close to the link base portion 16$a$, on its outside also provided with angled contact edges 19$b$. The contact edges 19$a,b$ are, in the region of the bearing points P between two interconnected coupling elements 15$a,b$, preferably arranged at an angle $\alpha$ and $\ominus$ between 90-180 degrees relative to the center line C of the link 11$b$ (see FIG. 6$a$). The angles $\alpha$ and $\theta$ may vary from each other but are here 135 degrees and thus equal.

The base portion 16$a$ is widened between the side legs 17$a,b$ of each coupling element and between the respective coupling elements 15$b$, in order to increase the surface which can be provided with high-friction elements 12 and/or low-friction elements 13. The connecting beam 18$a$ can also advantageously be coated with high friction element 12 (not shown).

FIG. 6$b$ shows how the contact edges 19$a,b$, here specifically the contact edge 19$b$, can also be formed concavely curved/arcuate.

FIG. 6$c$ shows that it is also possible to arrange the contact edges 19$a,b$ parallel to the imaginary center line C of the link. In this variant of coupling element 15$d,e$ the mechanical contact between the links 11$d,e$ occurs between the base portion 16$a$ of a link 11$e$, and the connecting beam 18$a$ of an adjacent link 11$d$, the contact edges 19$a$ being said to be integrated in the connecting beam 18$a$, and the contact edges 19$b$ being similarly said to be integrated in the base portions 16$a$ of the links 11$d,e$ simply by their design.

Problems with this embodiment may be that the axial play between the links 11$d,e$ may increase unfavorably.

FIG. 6$d$ shows in principle different possible constructions of a base portion 16$a$ of a link and the coupling elements 15$a$ of these different links, where some of the coupling elements 15$a$ together with the base portion 16$a$ form closed loops, the respective links 11$f,g$ base portion 16$a$ being provided with a closure/bridge 18$b$ in the region between the side legs 17$a,b$ connections to the base portion 16$a$ of the link 11$f,g$. Other coupling elements 15$a$ form "open loops" where the links 11$h$, in the base portions 16$a$, lack bridges and are open between the side legs 17$a,b$ of these coupling elements 15$a$. The figure also shows how parts of the base portion 16$a$ can be widened in order to stiffen up the links 11$f,h$ in their axial direction and/or to increase the space for high-friction elements 12 and/or low-friction elements 13 (not shown).

Figure 7:
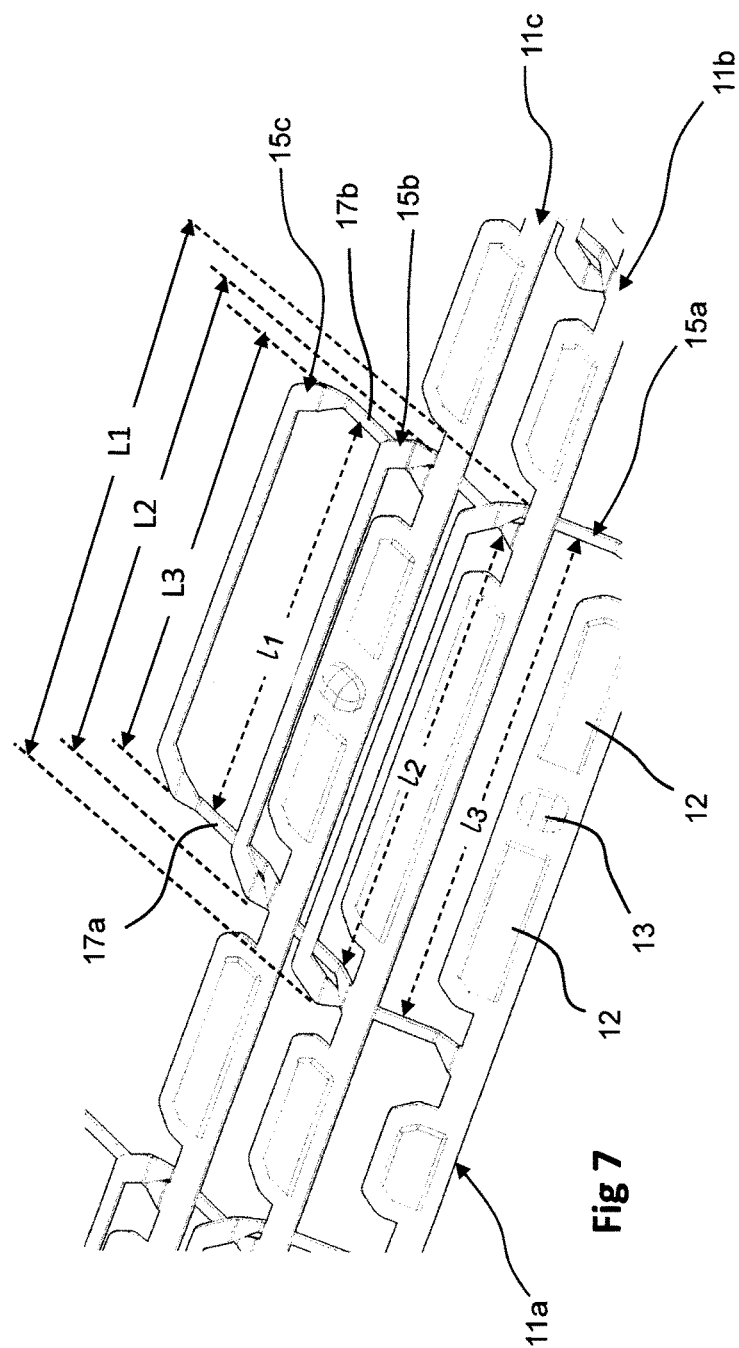
FIG. 7 shows three interconnected links and here it is shown that the coupling elements on the different links have different outer and inner lengths in order to enable interconnection.

FIG. 7 shows how coupling elements 15$a$-$c$ of adjacent links 11$a$-$c$ are formed with outer lengths, L1, L2 and L3, which differ from each other. The assembly of the links 11$a$-$c$ begins with the link 11$a$, whereupon the coupling element 15$b$ of the link 11$b$ is inserted into the coupling element 15a of the link 11a, whereupon the coupling element 15c of the link 11c is inserted into the coupling element 15b of the link 11b.

The outer length L3 of the coupling element 15c is smaller than the inner length 12 of the coupling element 15b. The outer length L2 of the coupling element 15b is smaller than the inner length 13 of the coupling element 15a. This ensures that the coupling elements 15a-c of the links 11a-c can be inserted into each other without obstacles, which enables a rational manufacture/assembly.

It should also be noted that the outer lengths of the links 11a-c differ from each other. This applies even if the outer length of the inserted coupling element has a small excess dimension relative to the inner length of the next link.

Figure 8A:
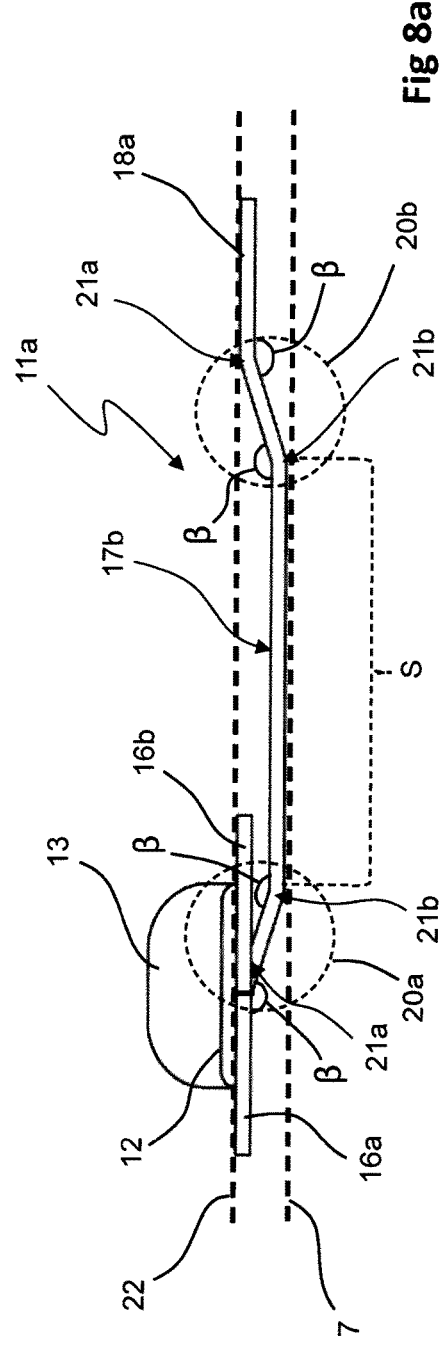
FIG. 8a shows a link in end view.

FIG. 8a shows in more detail the fundamental design of a link 11a according to the invention, seen in the end view of the link 11a. Arranged on the outer surface of the base portion 16a of the link 11a are located high friction elements 12 and low friction elements 13. The side legs 17a,b (of which only 17b can be seen in the end view shown in the figure) extends outwards and downwards from the base portion 16a of the link 11a. The side legs 17a,b are bent along two lines BL (see FIG. 8c) in a first region 20a near the base portion 16a of the link 11a and bent along two further lines BL (see FIG. 8c) in a second region 20b near the outer part of the side leg 17a,b and thus close to the connecting beam 18a which connects the outer ends of the side legs 17a,b. In each bending region 20a,b, two bending points 21a,b are thus arranged per side leg 17a,b; each bend the goods/foil to the angle β. The connecting beam 18a is arranged in substantially the same level/plane as the base portion 16a of the link 118, i.e. in the operating surface 22 of the mat. The route S of the side legs 17a,b may also be slightly arched/bended but is substantially parallel to the base portion 16a and the upper surfaces of the connecting beam 18a, but not arranged in the same plane, and arranged to constitute the mechanical/physical contact of the mat 2 against a supporting surface, such as e.g. the support surface 7 of a beam 6, at least when the mat/cylinder 2 is in the region of the operating opening 4 of the pointing device 1.

The angles β, shown in FIG. 8a, are suitably about 160 degrees but are preferably in the range 135-170 degrees. Too large an angle 13 complicates or prevents the mat 2 from being stretched in a straight line, which in turn means that the mat cannot lie flat against a surface such as the support surface 7 of the beam 6. A too small angle β risks leading to plastic deformation, in particular in the bending points 21b of the link 11a if a user with his fingertips applies a larger separating force/traction against the links 11a-c in the longitudinal direction of the mat 2.

Figure 8B:
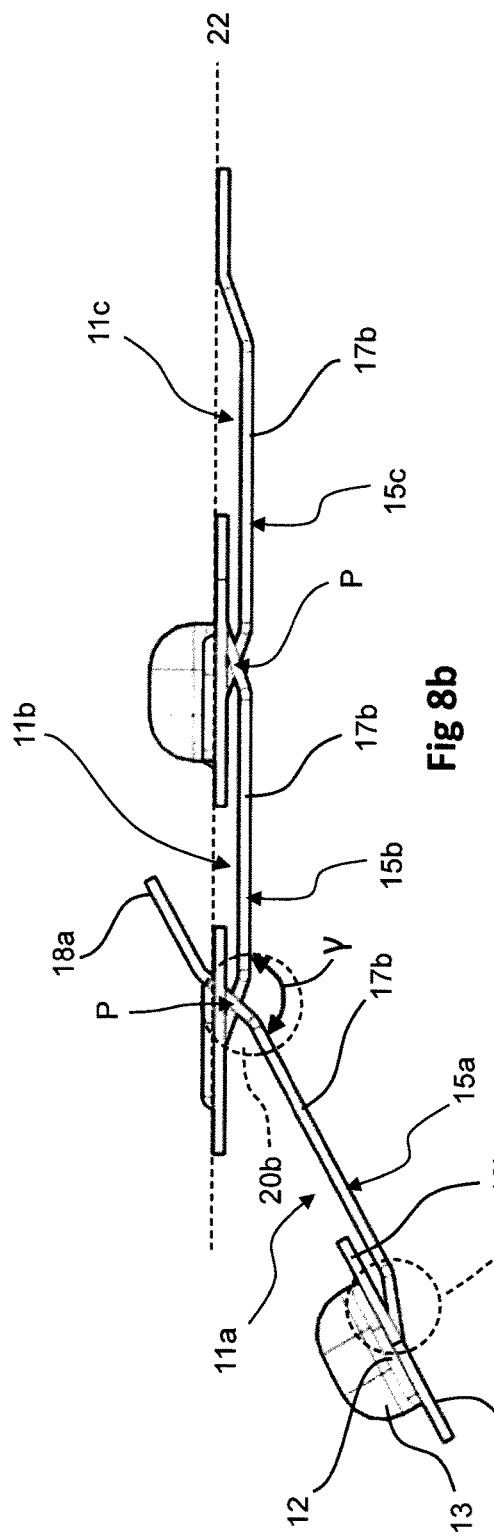
FIG. 8b shows in an end view interconnected links which are slightly rotated at an angle relative to each other and FIG. 8c shows i.a. in which points two interconnected links are in mechanical contact with each other and along which lines the coupling elements are bent.

FIG. 8b shows the two links 11a and 11b slightly rotated at an angle y relative to each other. In a normal application of the invention, the angle γ between two adjacent links 11a,b at the rotation of the mat/cylinder 2 can vary in the range 0-90 degrees, depending on the position of the links 11a,b around the beam 6 and depending on the diameter of the edge of the beam 6 or rod 8 about which the links 11a,b rotate. The side legs 17a,b of the links are bent so that the links 11a,b, in their assembled state, at each bearing point P where a coupling element 15a is in mechanical contact with an adjacent link's coupling element 15b can be said to form a cross seen in the end view of the links 11a,b when the mat 2 is stretched in its longitudinal direction.

Figure 8C:
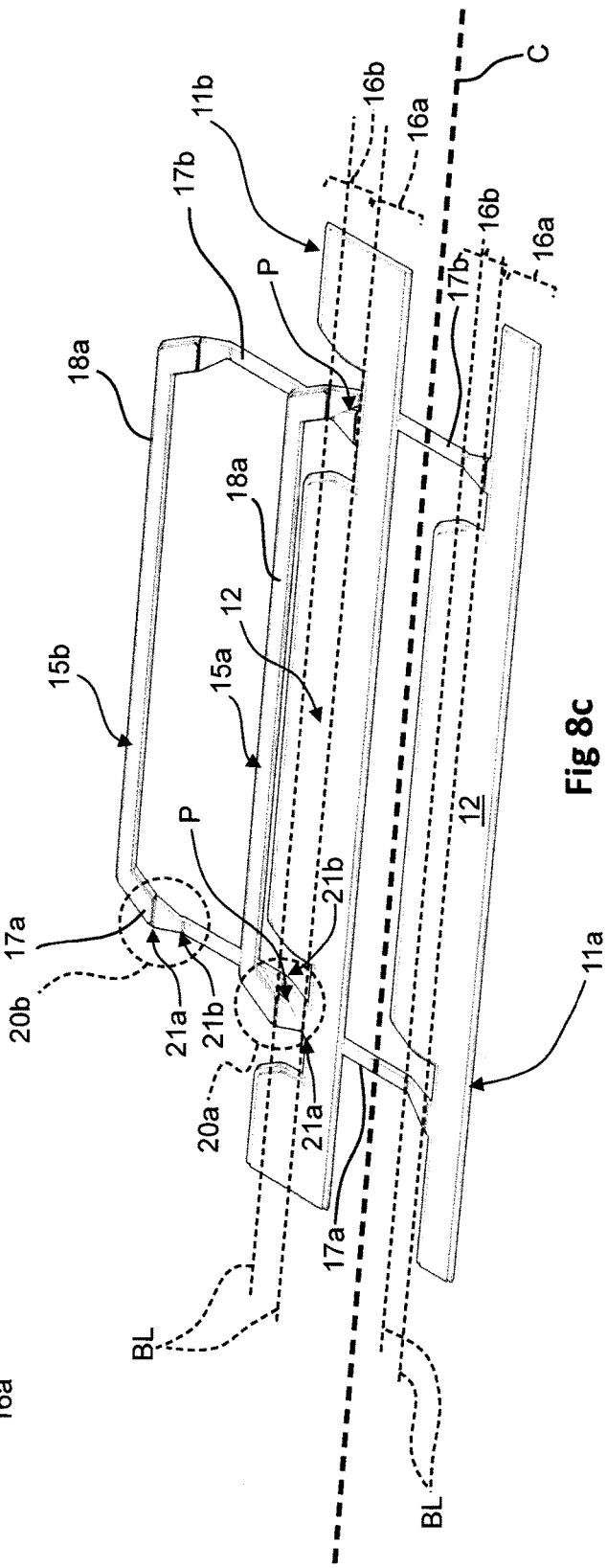

FIG. 8c shows that the mechanical contact between two adjacent links 11a,b occurs in the bearing points P, located within the region 20a when the mat 2 is assembled and stretched in its longitudinal direction. The coupling element 15a of one link 11a extends from its attachment in the base portion 16a under the base portion 16a of the adjacent link 11b and is then mechanically coupled to the coupling element 15b of this next link 11b. At least one, but preferably all, of the coupling elements of a link are arranged in this way. The contact between the links 11a,b thus takes place at the bearing points P and adjacent links can thus rotate relative to each other about an imaginary line, drawn through the bearing points P when the mat 2 is assembled and stretched in its longitudinal direction.

FIG. 8c also shows how the bending points 21a,b in the bending regions 20a,b of the respective side legs are located along the bending lines BL (dashed) which run parallel to the imaginary center line C of the link 11a.

The coupling element 15a is thus bent along at least one such bending line BL arranged between the imaginary center line C of the link and the bearing points P of the coupling element.

Figure 9:
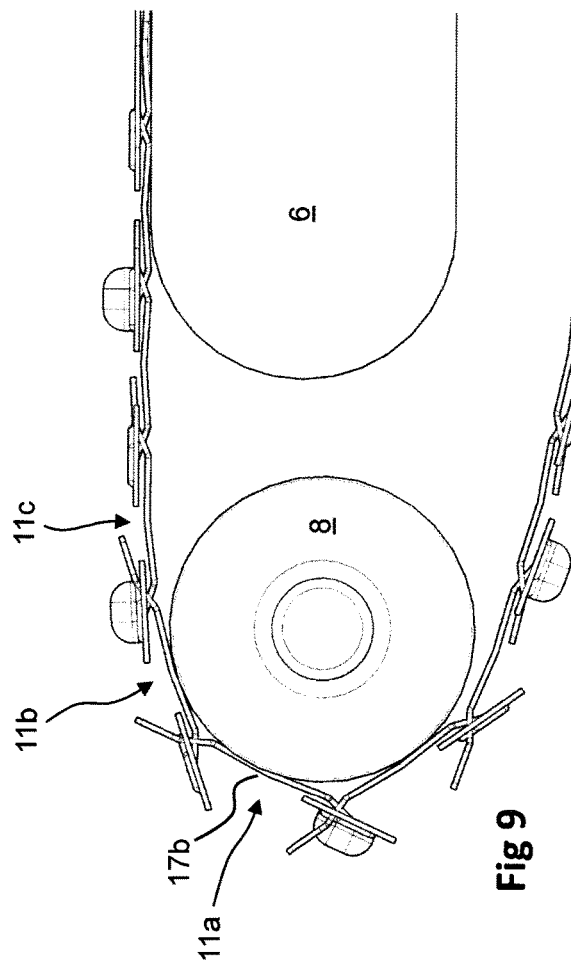
FIG. 9 shows in end view how the links rotate relative to each other as they pass around a rod, located outside the side edge of the beam.

FIG. 9 shows in end view how the links 11a-c rotate/turn relative to each other when they pass a rod 8, placed outside one side edge of the beam 6. Here it can also be seen how the side legs 17b are slightly curved to better adapt to the radius of the rod 8. This curved shape can be made larger or smaller or of course can be omitted.

Figure 10A:
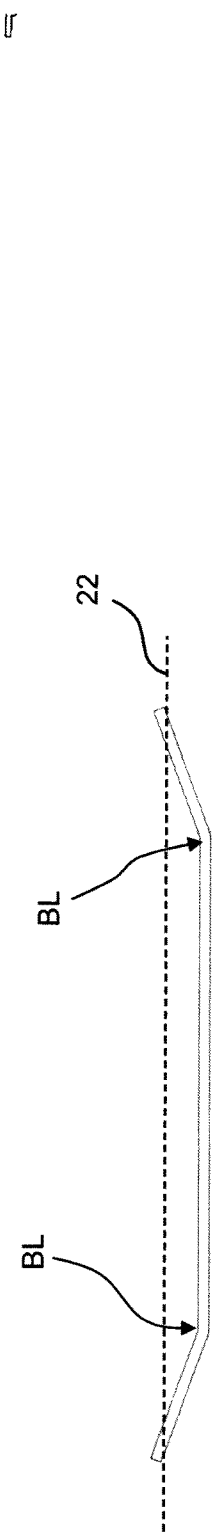
FIGS. 10a to f show in end view how the coupling elements and their side legs can be bent in different ways.

FIG. 10a shows a variant of a link which, seen in end view, is bent along only two lines BL. A mat 2 according to the Invention can of course be made up of a number of such links. However, this has the disadvantage that the upwardly directed both outer ends/edges of the links may feel sharp/sharp, and thus uncomfortable, to the user. Any high-friction coatings (not shown) will then also not be mutually parallel or parallel to the operating surface 22, which obstructs the user's mechanical contact with the high-friction coatings.

Figure 10B:
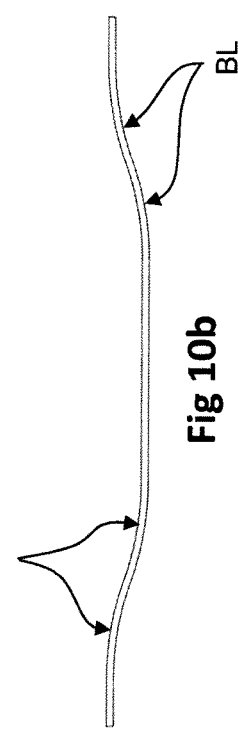

FIG. 10b shows in end view in principle how a link can be bent and bent with a large radius so that the link becomes partially arcuate seen in the end view of the link, and this applies to all bend geometries. A bending thus does not have to be sharp with a small radius but can be performed with a larger radius.

Figure 10C:
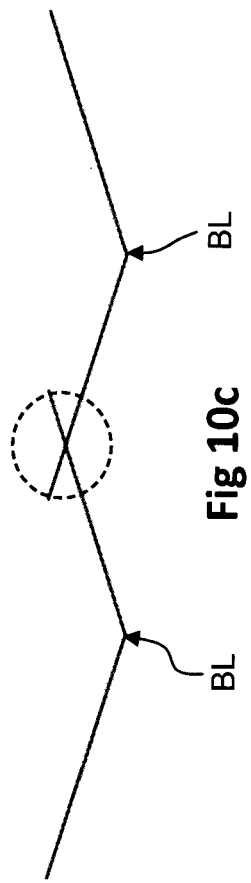

FIG. 10c shows two interconnected alternative links, each bent along only one bend line BL, seen in the end view of the links.

Figure 10D:
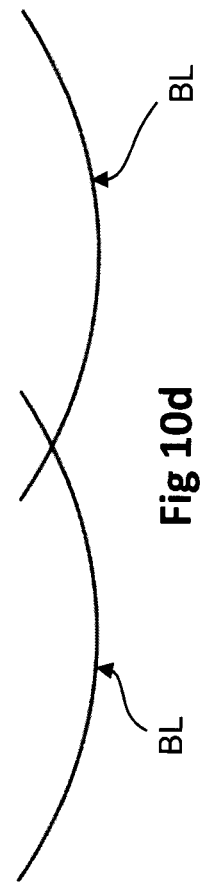

FIG. 10d shows two interconnected links, each bent with a very large radius so that a substantially completely curved/bent or arcuate coupling element is provided.

Figure 10E:
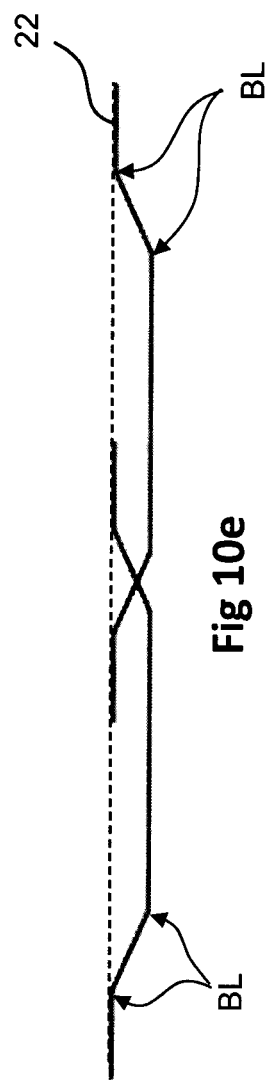

FIG. 10e shows a link where base portions and connecting beams are located in the same plane, and parallel to the operating surface 22 of the mat. The embodiments shown in FIGS. 10a-d and 10f can also of course be supplemented in a similar manner.

Figure 10F:
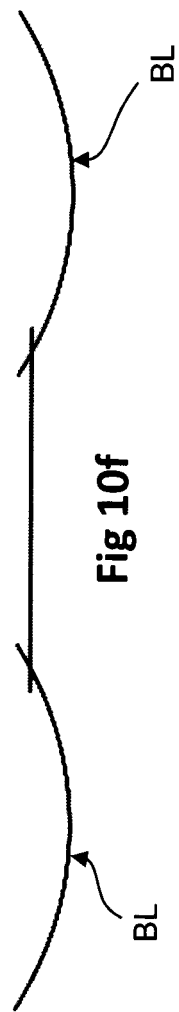

FIG. 10f shows a combination of two different interconnected links, one of which is arcuate and one is substantially straight, seen in end view. By combining them and connecting them alternately to each other, it is achieved that the mat/cylinder 2 can still lie flat against a supporting surface when it is stretched in its longitudinal direction, despite the fact that every other link lacks bending.

Common to all embodiments is that the contact between the links forms a cross seen in the end view of the links (shown circled in FIG. 10c).

Figure 11:
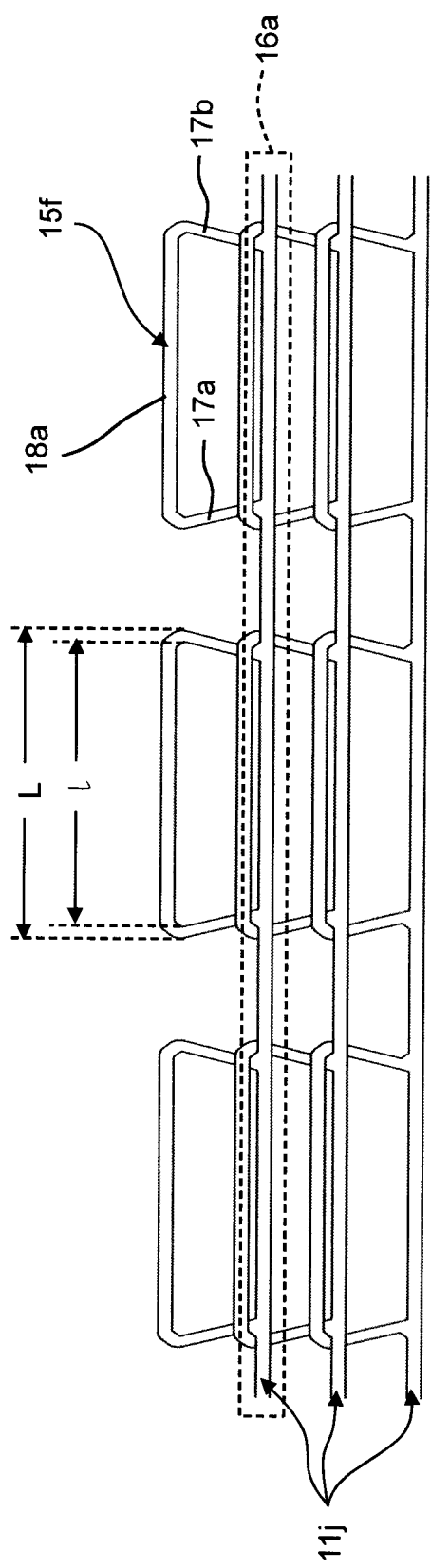
FIG. 11 shows an alternative embodiment of coupling elements, provided with side legs arranged at an oblique angle to the base portion.

FIG. 11 shows an alternative embodiment of coupling elements 15f, provided with side legs 17a,b inclined relative to the base portion 16a of the link. The length of these coupling elements 15f is greater at its connecting outer connecting beam 18a than at its inner part, at the attachment in the base portion 16a. As a result, links 11j with the same outer length of the coupling elements 15f can theoretically be interconnected with each other, but a disadvantage is that the manufacture is considerably more difficult as the connecting beam 18a of each coupling element 15f must be strongly bent to be inserted into the corresponding coupling element 15f in next link 11j.

Figure 12:
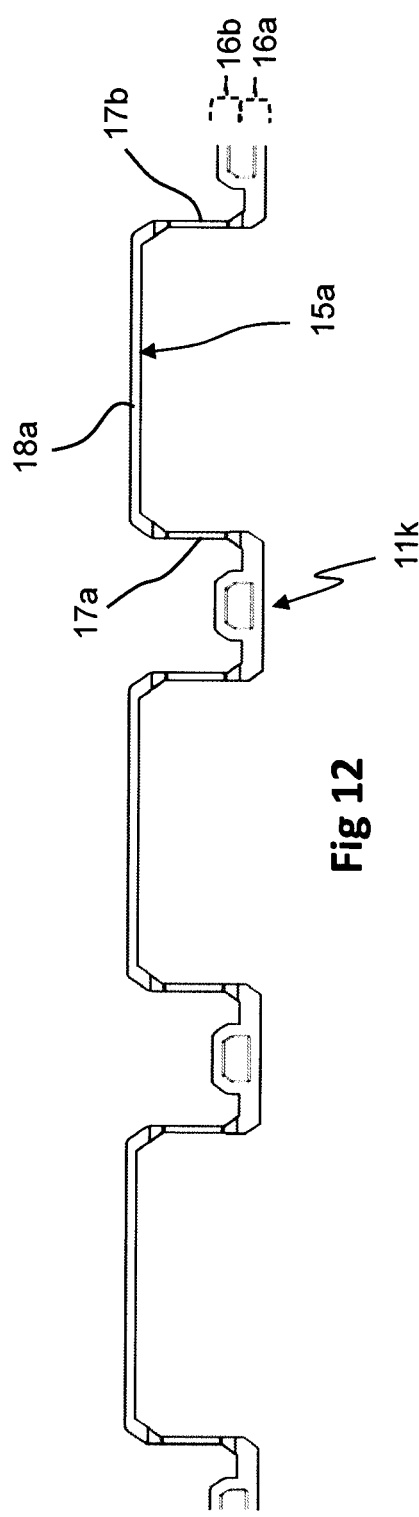
FIG. 12 shows a link where the base portion is open between the side legs of each coupling element.

FIG. 12 shows a link 11k where the base portion 16a is open between the side legs 17a,b of the coupling elements 15a. An advantage of this design is that the link Ilk has a lower weight which contributes to a lower friction when moving the mat/cylinder 2 but at the same time the axial rigidity of each link 11k is reduced, as well as the space for mounting high friction elements 12 and low friction elements 13.

FIGS. 13a-c show a so-called middle link 11l to which other links (not shown here) are connected on each side, and out in two directions, via the recesses 15g. FIG. 13a shows the middle link 11l in its entire extent and FIG. 13b shows a part of the outer end portion of the center link 11l in more detail. FIG. 13c shows in an end view how the center link 11l is bent.

This symmetrical central link 11l is, in the same way as other links, preferably bent in two regions 20a,b with two bending points 21a,b each. The two outer longitudinal edges 24a,b are located in substantially the same plane.

Figure 14:
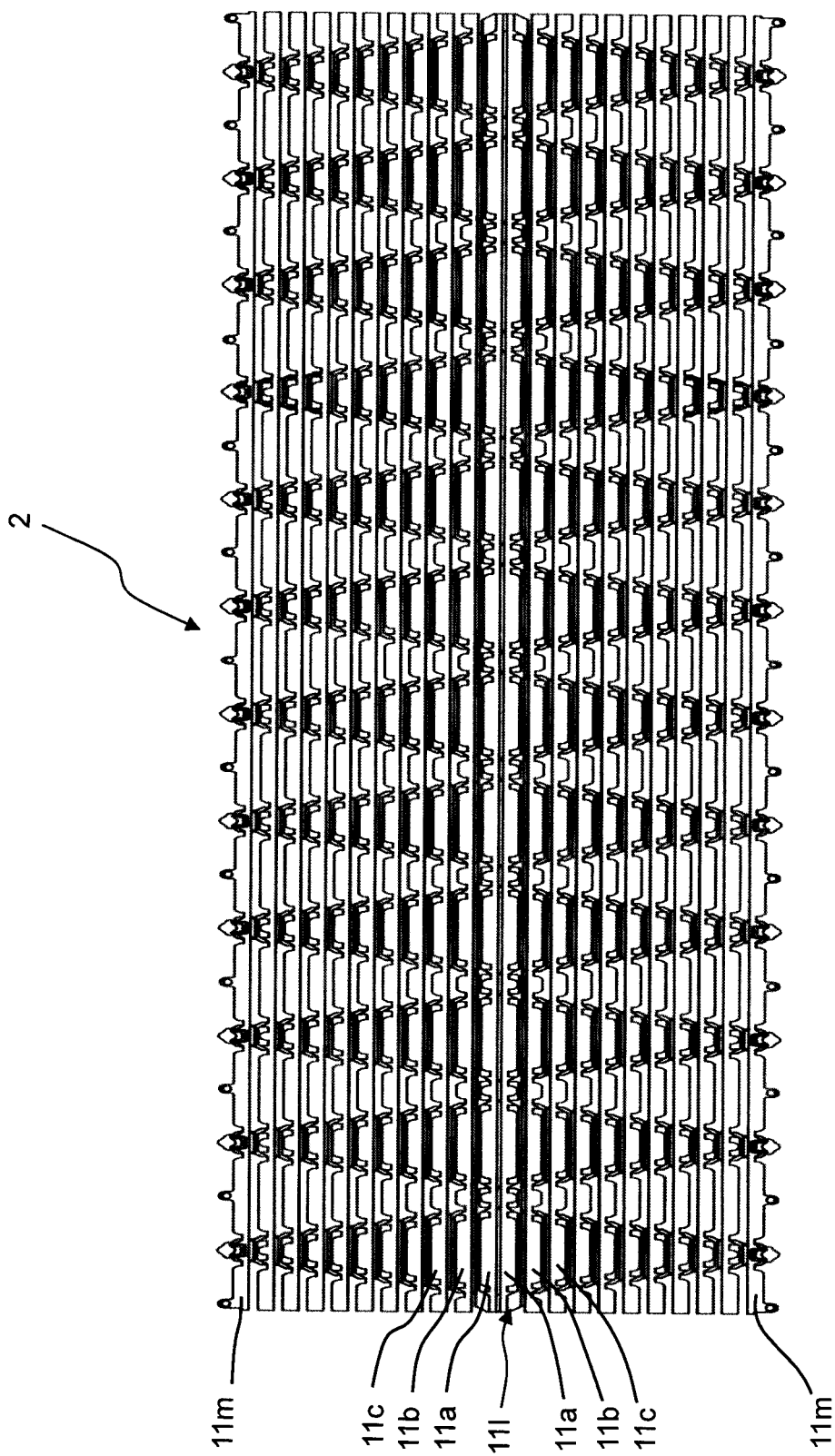
FIG. 14 shows a possible embodiment of a mat where links are mounted symmetrically starting from a middle link according to FIGS. 13a-c.

FIG. 14 shows an embodiment of a mat 2, where links 11a-c,m have been mounted symmetrically starting from said middle link 11l.

Figure 15:
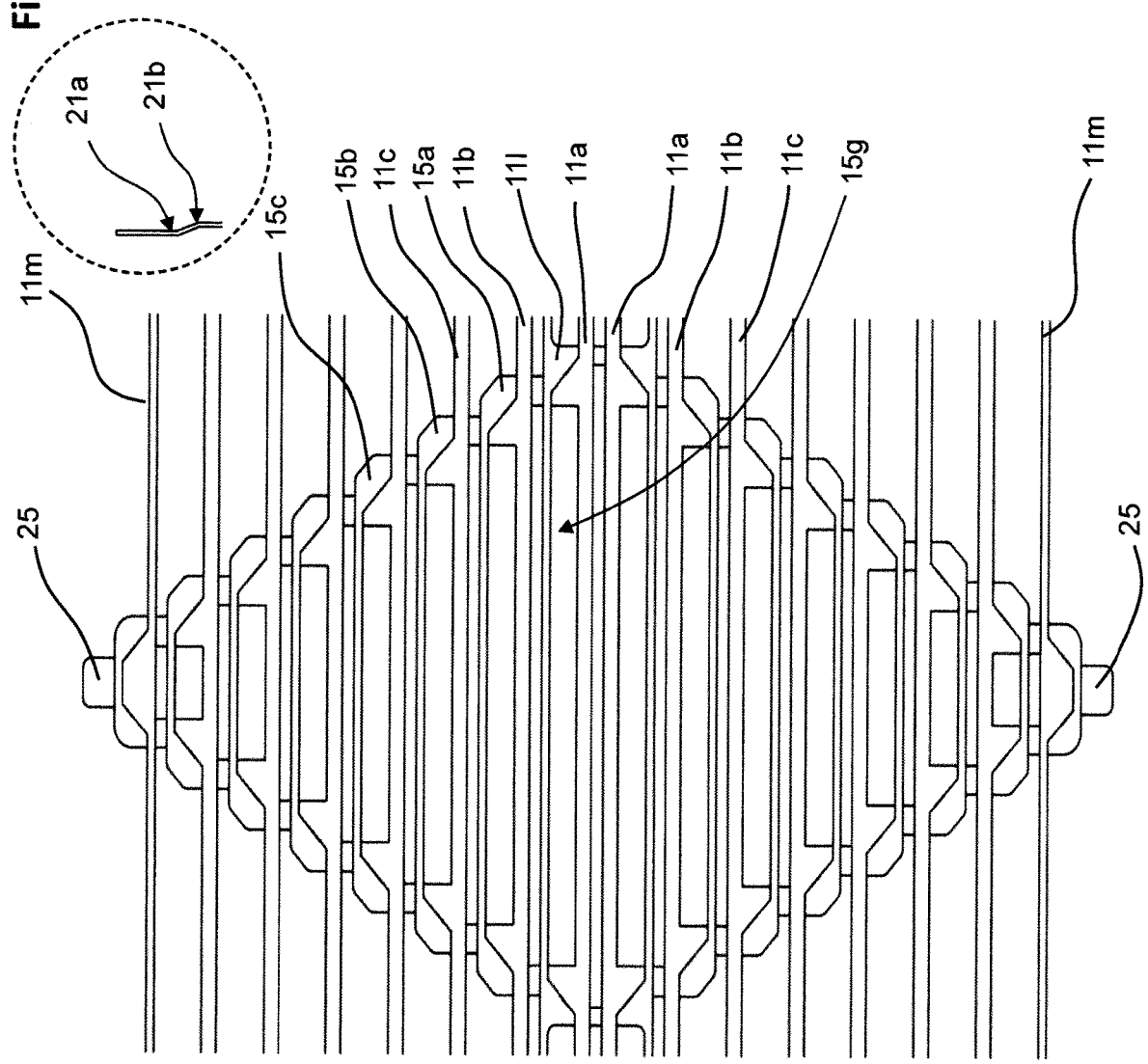
FIGS. 15a and b show a part of a mat consisting of a number of links extending in two directions from a middle link.

FIG. 15a shows in more detail how, in the manufacture of an embodiment of a mat 2, one starts from a middle link 11l and inserts the coupling element 15a of a first link 11a into the recesses 15g, corresponding to the space between side legs 17a,b, which are arranged in the middle link 11l. The inner length 1 (see FIG. 13a) of the recesses 15g in the middle link 11l is larger than the outer length of the coupling element 15a of the first link 11a. In the next manufacturing step, a second link 11b is inserted Into the first link 11a, the inner length of the coupling element 15a of the first link 11a being greater than the outer length of the coupling element 15b of the second link 11b, and so on. Each additional link 11a-c,m is then provided with gradually shorter coupling elements 15a-c, but placed at the corresponding axial position on the links 11a-c,m. During manufacture, links 11a-c,m are inserted both upwards and downwards, seen in FIG. 15a, from the middle link 11l in both directions until a symmetrical mat 2 is obtained.

The last/outermost links, called connection links 11m, can, but need not be, provided with joint elements 25, shown here in the form of "joint tongues" and bent at only two points 21a,b, shown in the end view in FIG. 15b. The connection link 11m on one side of this mat 2 can be connected together via its joint elements 25, via an overlap joint 26 (see FIG. 16a,b), with the joint elements 25 of the connection link 11m on the other side of the mat 2 so that a closed cylinder is obtained. Alternatively, and preferably, several such mats can be joint together into an arbitrarily long mat 2, or cylinder with a larger circumference. Thus, the two outermost links 11m of a mat 2 can be joined together, or joined to the outermost links 11m of additional mats 2, to form a cylinder of any circumference or a mat 2 of any length.

Figure 16:
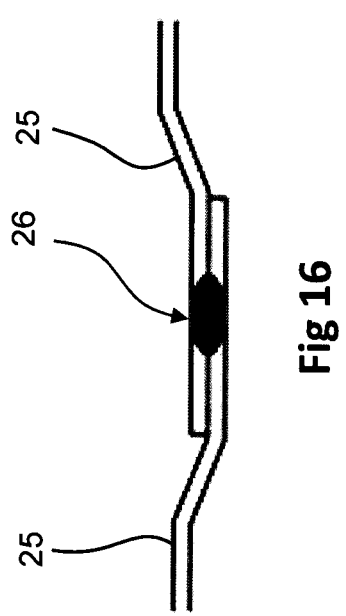
FIGS. 16a and b show how the so-called joint coupling elements suitably are welded to each other by means of, for example, spot welding.

FIGS. 16a and 16b show how the joint elements 25 preferably are welded to each other by means of, for example, spot welding and thus form an overlap joint 26. The joint elements 25 can also be fastened to each other in another way, e.g. by soldering or gluing.

In all the embodiments described above, the links 11a-c,m in the mats 2, once these are joint together via their outermost links 11m to a cylinder, are impossible to separate. However, the manufacture of a mat 2 for pointing devices 1 consisting of several mats 2 is in practice complicated, as the mats 2 are mechanically difficult to handle and must be located with precision relative to the other mats 2 before welding. It would be advantageous if an arbitrarily long mat 2 according to the present invention could be built in one piece, and it has been found that this is actually possible.

Figure 17:
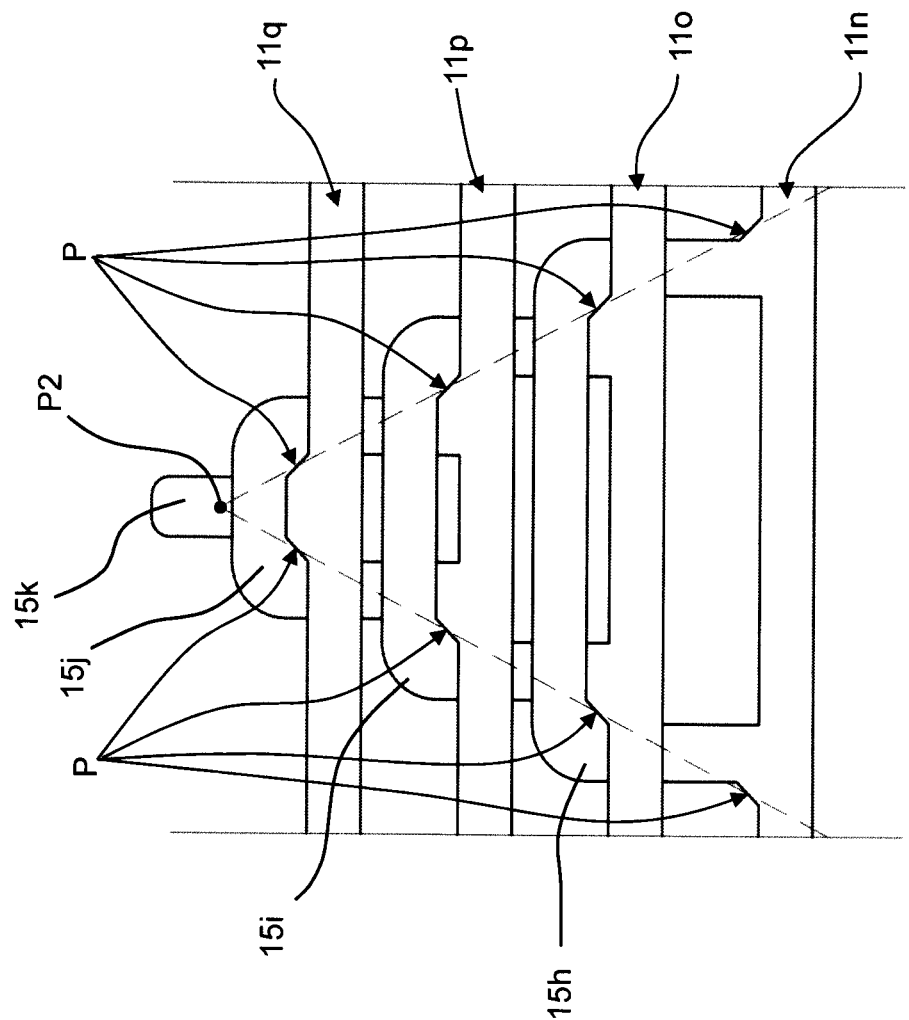
FIG. 17 shows how the so-called starting, intermediate and ending coupling elements are connected to each other, whereby dashed lines run through the bearing points where mechanical contact occurs between the coupling elements of the various links.

FIG. 17 shows a group of links 11n-q, provided with the coupling elements 105h-k respectively. The assembly of the links 11n-q starts with a first link 11n, which can therefore be said to be provided with a starting coupling element 15h. Then two in the assembly order intermediate links 11o and 11p, provided with the coupling elements 15i,j respectively, are mounted. The last link 11q in the assembly order can be said to be provided with an ending coupling element 15k, since no succeeding coupling element is inserted in this coupling element 15k. The coupling elements 15i,j are mechanically, and also in assembly order, intermediate the starting coupling element 15h and the ending coupling element 15k and can therefore be said to be intermediate coupling elements 15i,j.

Starting, intermediate and ending connecting elements are hereby defined as follows:

A starting coupling element is not inserted/located in any other coupling element but has a coupling element inserted/located in itself.

An intermediate coupling element is inserted/located in a starting or intermediate coupling element and has an additional intermediate or ending coupling element inserted/located in itself.

An ending coupling element is inserted/located in a starting or intermediate coupling element but has no succeeding coupling element inserted in itself.

Figure 13:
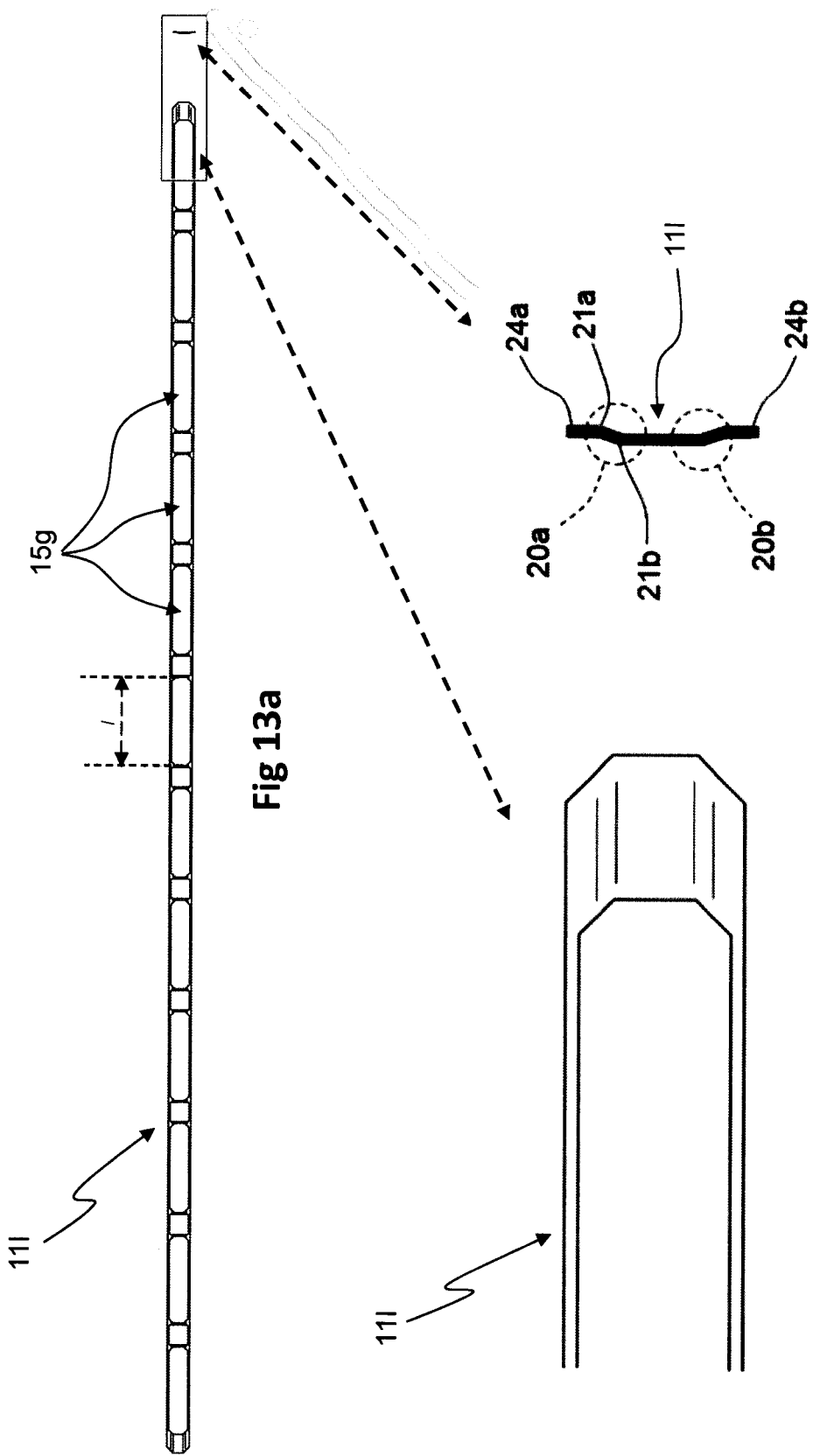
FIGS. 13a to c show a so-called middle link to which other links are intended to be connected in two directions.

This means that the middle link 11l, shown e.g. in FIGS. 13 a-c, is arranged with starting coupling elements, here denoted by 15g.

Here, the term "inserted" has been used, but the definitions mentioned above apply even if all links and coupling elements are produced with a method that eliminates the need for the coupling elements to be really mechanically/physically inserted/slid into each other. Such a method can e.g. be 3D printing, where the mechanics shown e.g. in FIG. 17 can be produced in a single process where the links are already placed, or "inserted/located", into each other. The essential thing is that the coupling elements are possible to be inserted/pushed into each other so that one coupling element "is located in" the other, not necessarily that they have actually been moved into each other.

It is important to note that with the exception of the ending coupling element 15k in FIG. 17, none of the coupling elements 15h-k can slide out of the coupling element it is inserted into, as this is mechanically prevented by the coupling element "next" in the assembly order. However, in the assembly order, the ending coupling element 15k has no next coupling element which can prevent an exit (a separation). This applies in general; only an ending coupling element 15k can potentially slide out of the coupling element into which it is inserted.

FIG. 17 shows dashed lines connecting the bearing points P where contact exists between the coupling elements 15h-k of adjacent links, and how these lines run substantially diagonally and converge towards a common point P2. The coupling elements 15h-k can therefore be said to form a converging series. It can be noted that the outer lengths of the coupling elements 15h-k of the links are different. It is obvious that the number of coupling elements which can form a converging series is limited, since sooner or later it is unconditional to arrive at an ending coupling element in which no further coupling element can be inserted. It should be noted, however, that an ending coupling element may very well be made e.g. with side legs and connecting beam similar to the above described connecting elements, so that it would in principle be possible to insert another connecting element but that this has not happened.

The following text describes various embodiments of mats according to the present invention which can be made arbitrarily long, without the need for splicing/joining. These mats can then be transformed into a cylinder via only one single joint. The mats in their simplest form comprise at least one link which is provided with at least one, preferably several, ending coupling elements and at least one, preferably several, starting coupling elements. A separation of two coupling elements can take place in this type of mat when/if the ending coupling element slides out of the coupling element in which it is inserted. If all coupling elements between two adjacent links separate, these links will of course separate. These mats must therefore be kept in a tensioned condition to reduce/eliminate the risk of separation of coupling elements and, in the worst case, links. This can make them unsuitable for use in pointing devices, as a user could press links with the fingers in the operating area so that at least one or more coupling elements separate, which would at least interfere with the tangential flexibility of the mat and thereby reduce the mat's smooth and easy movement around the beam.

Figure 18:
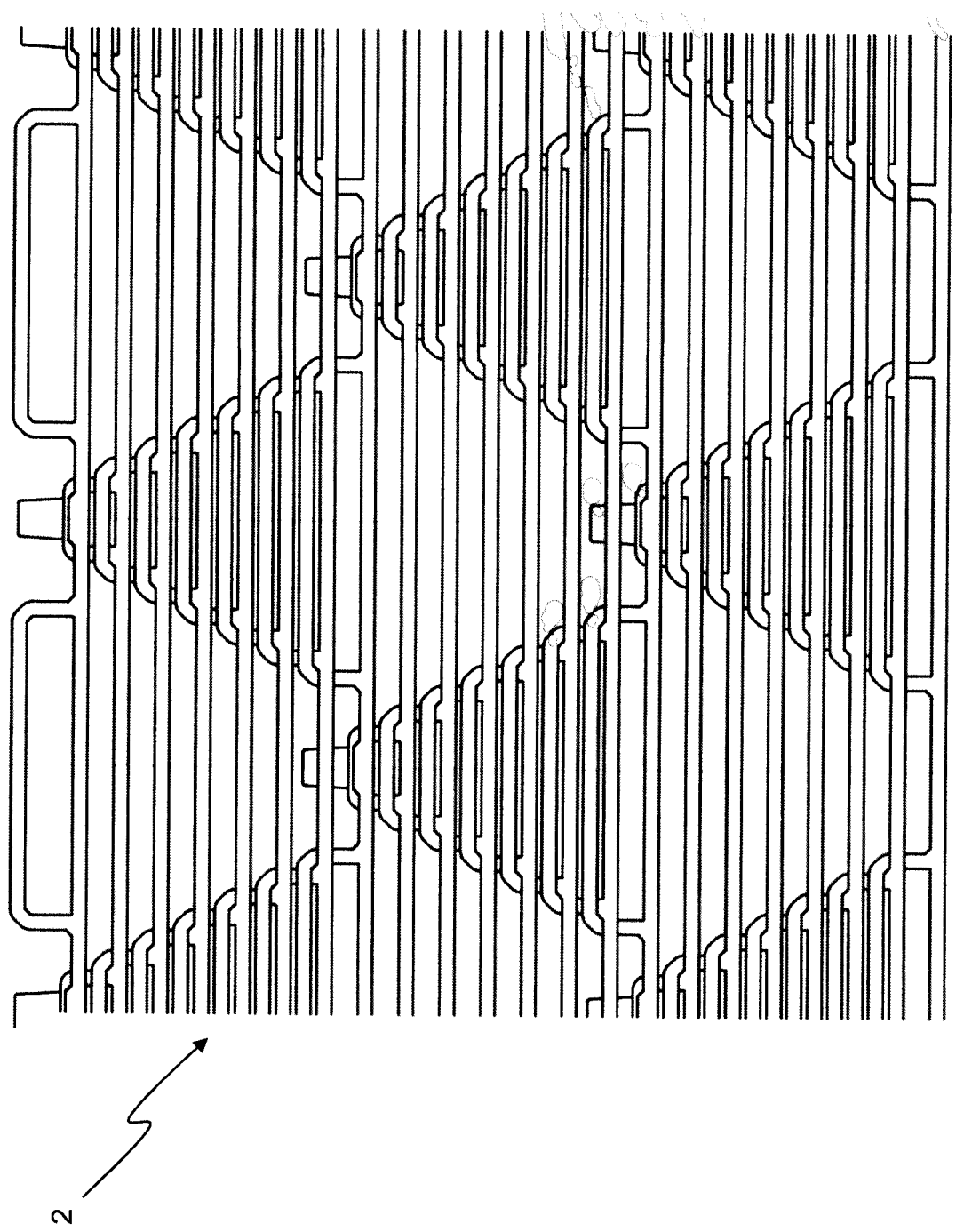
FIG. 18 shows an example of how links with starting, intermediate and ending connecting elements are joined to a mat.

FIG. 18 shows a mat with a number of links where the number of intermediate coupling elements in each converging series is six. The number of intermediate coupling elements in different converging series can be both larger and smaller in other embodiments. Also, in FIG. 18, converging series can be identified. The last link in each converging series is provided with both ending coupling elements and starting coupling elements, which enables an additional link provided with intermediate coupling elements to be inserted into this link.

In this way, an arbitrarily long mat can be manufactured by repeating the pattern of links/coupling elements according to FIG. 18. Mats of this type should always be kept stretched as the ending coupling elements otherwise can slip out of the coupling elements they are inserted in.

The number of intermediate coupling elements in each converging series of coupling elements is thus optional. The maximum possible number of intermediate coupling elements is determined by the length of the starting coupling elements and the width of the side legs of the next coupling elements.

Figure 19:
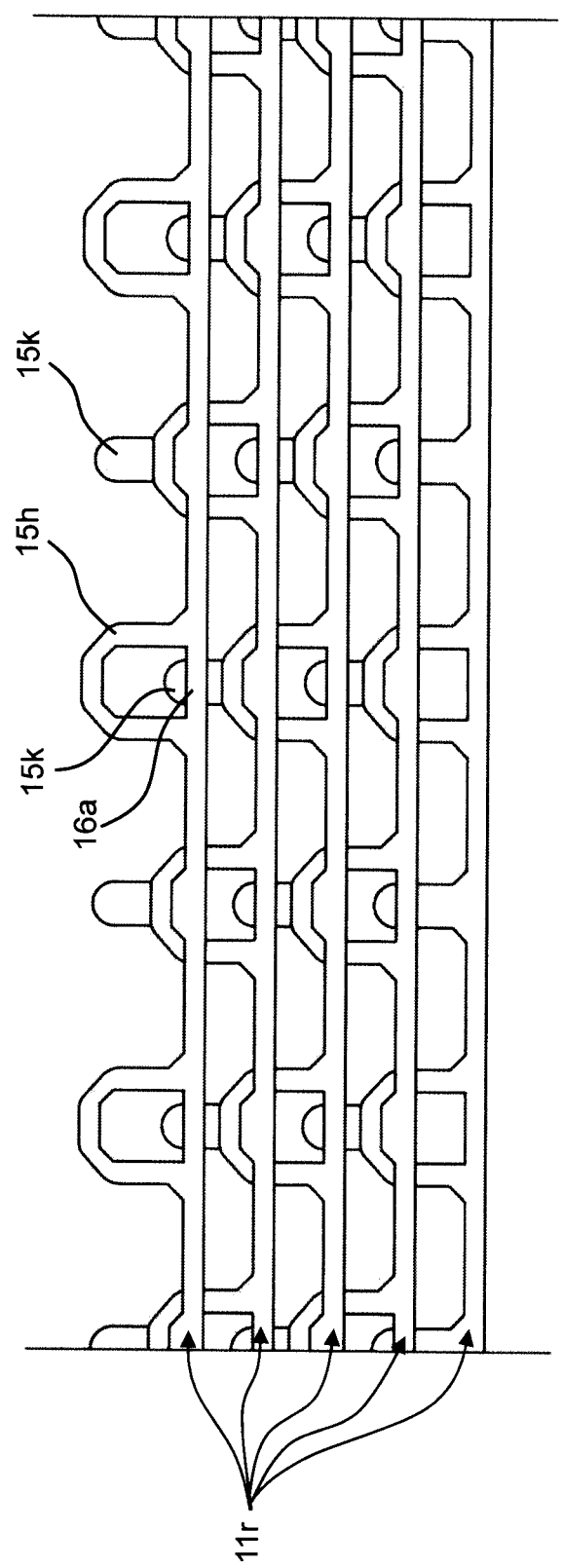
FIG. 19 shows a simple embodiment of a mat where only the starting and ending coupling elements are arranged on the respective link.

FIG. 19 shows the probably simplest embodiment of a mat 2 according to the invention, where intermediate coupling elements in each converging series of coupling elements are missing. The links 11r here consist of a single type/design, provided with both starting and ending coupling elements 15h,k located along one side of the link 11r, every other starting, every other ending. Mats 2 according to this embodiment should also be kept streched as coupling elements 15h,k and thus entire links 11r can otherwise separate.

However, it is possible to construct arbitrarily long mats with the very advantageous property that coupling elements and thus links hardly or never in practice separate from each other, even if the mat is not stretched. Common to all such variants of mats is that links provided with ending coupling elements are also provided with intermediate coupling elements.

Separation of coupling elements is made even more difficult if the ending coupling elements on a link extend at least partially below the base portion of the link following in the assembly order, seen in perpendicular view from above and towards the mat (shown in FIGS. 20, 21 and 22).

Figure 20:
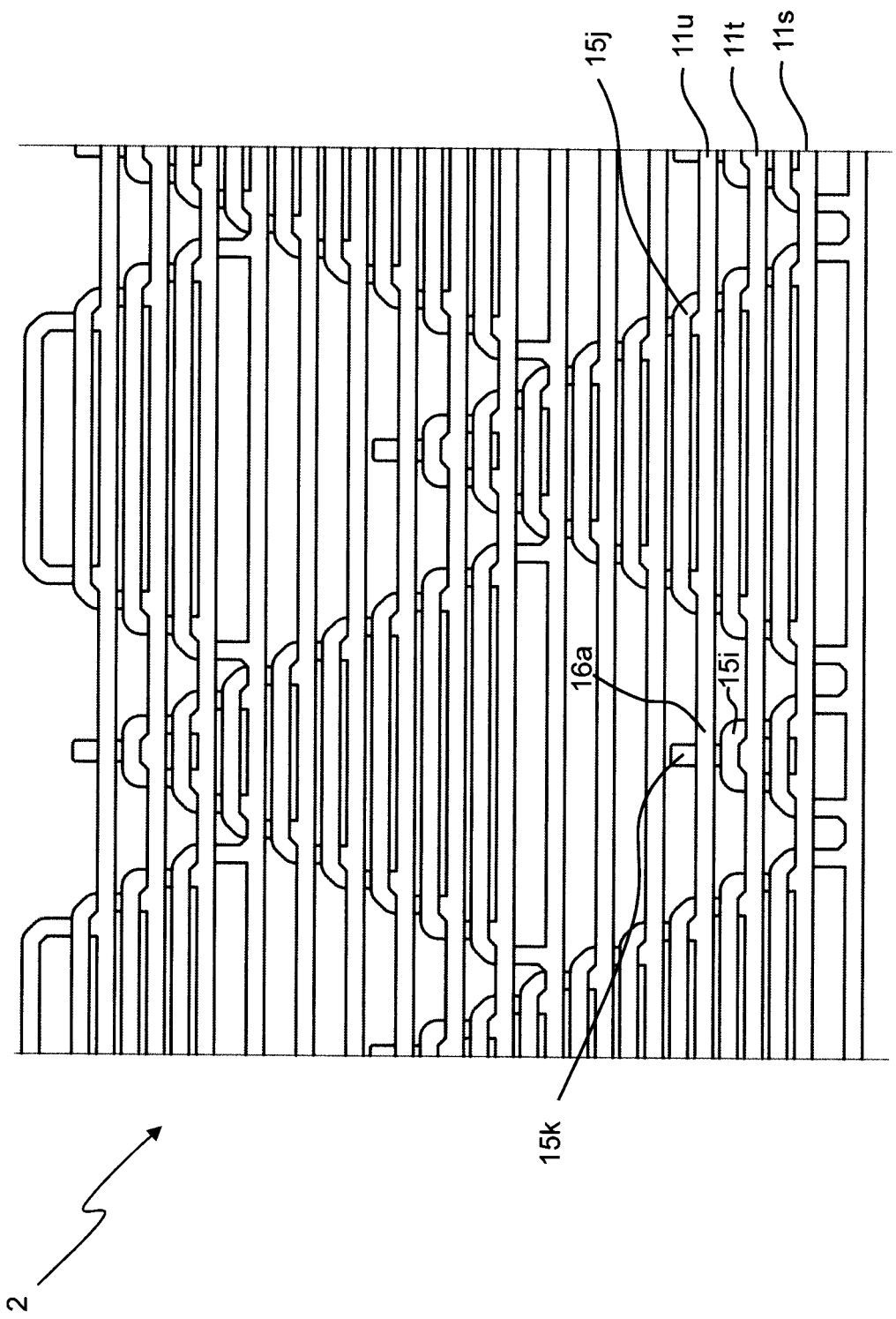
FIG. 20 shows an embodiment in which a link is provided with ending and intermediate coupling elements.

FIG. 20 shows an embodiment of such a type of mat 2 where separation of the links is in practice eliminated. Here, a link 11t is provided with at least one ending coupling element 15k, but also provided with at least one intermediate coupling element 15j. The ending coupling element 15k is arranged to extend below the base portion 16a of the next link 11u, which contributes to aggravate the separation of the coupling elements 15k and 15i. The pattern of coupling elements 15j,k is advantageously repeated in the axial direction of the links, so that the link 11t is provided with intermediate coupling elements 15j, placed on each side of the ending coupling elements 15k.

Common to all embodiments of mats according to the present invention is that all coupling elements on a link do not have to be in contact with coupling elements of an adjacent link, since the contact or hinge edges 19a,b mentioned in FIG. 6a may be missing in some of the coupling elements on a link. The pivoting to an adjacent link takes place in this case via the contact edges 19a,b of the other coupling elements of the link.

Figure 21:
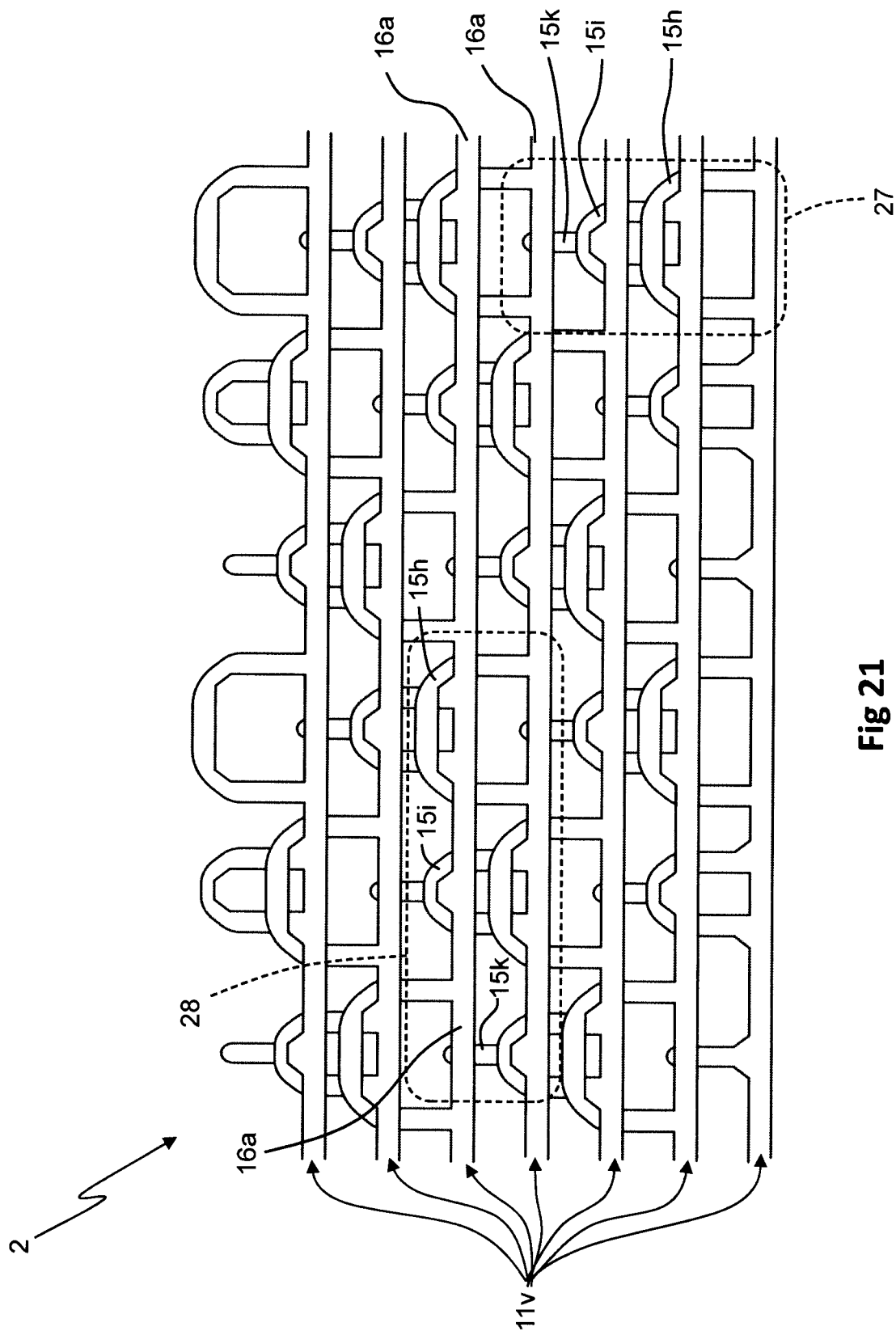
FIG. 21 shows a preferred embodiment of mat where the links are arranged with three different coupling elements, start, intermediate and ending.

FIG. 21 shows a preferred embodiment of a mat 2, suitable to be connected to a cylinder for a pointing device 1. The number of intermediate coupling elements 15i in each converging series 27 of coupling elements 15h,i,k is the smallest possible for coupling elements to not risk separating, i.e. a single one, and the number of coupling elements in each converging series 27 is thus three (a starting 15h, an intermediate 15i and an ending 15k). Each link 11v has the same design as the other links in this mat 2, which facilitates manufacture and assembly.

The link 11v is provided with an ending coupling element 15k, an intermediate coupling element 15i, and a starting coupling element 15h which form a group 28 of coupling elements 15h,i,k-j arranged one after the other along the base portion 16a of the link 11v. After the first group 28 of coupling elements 15h,i,k on the link 11v comes a new similar group 28 of coupling elements 15h,i,k, seen in the axial direction of the links 11v. Other links 11v are provided with corresponding axially repeated groups of ending, intermediate and starting coupling elements 15h,i,k arranged in the axial direction of each link 11v. The coupling elements 15h,i,k on a link 11v are offset relative to the corresponding coupling elements 15h,i,k on an adjacent link 11v, seen in the axial direction of the links.

The risk of separation of coupling elements 15h,i,k and thus links 11v even if the mat 2 is not stretched is minimized, partly because links 11v which are provided with ending coupling elements 15k (in this case all links 11v), also are provided with intermediate coupling element 15i, while all ending coupling elements 15k extend below the base portion 16a of adjacent link 11v.

Figure 22:
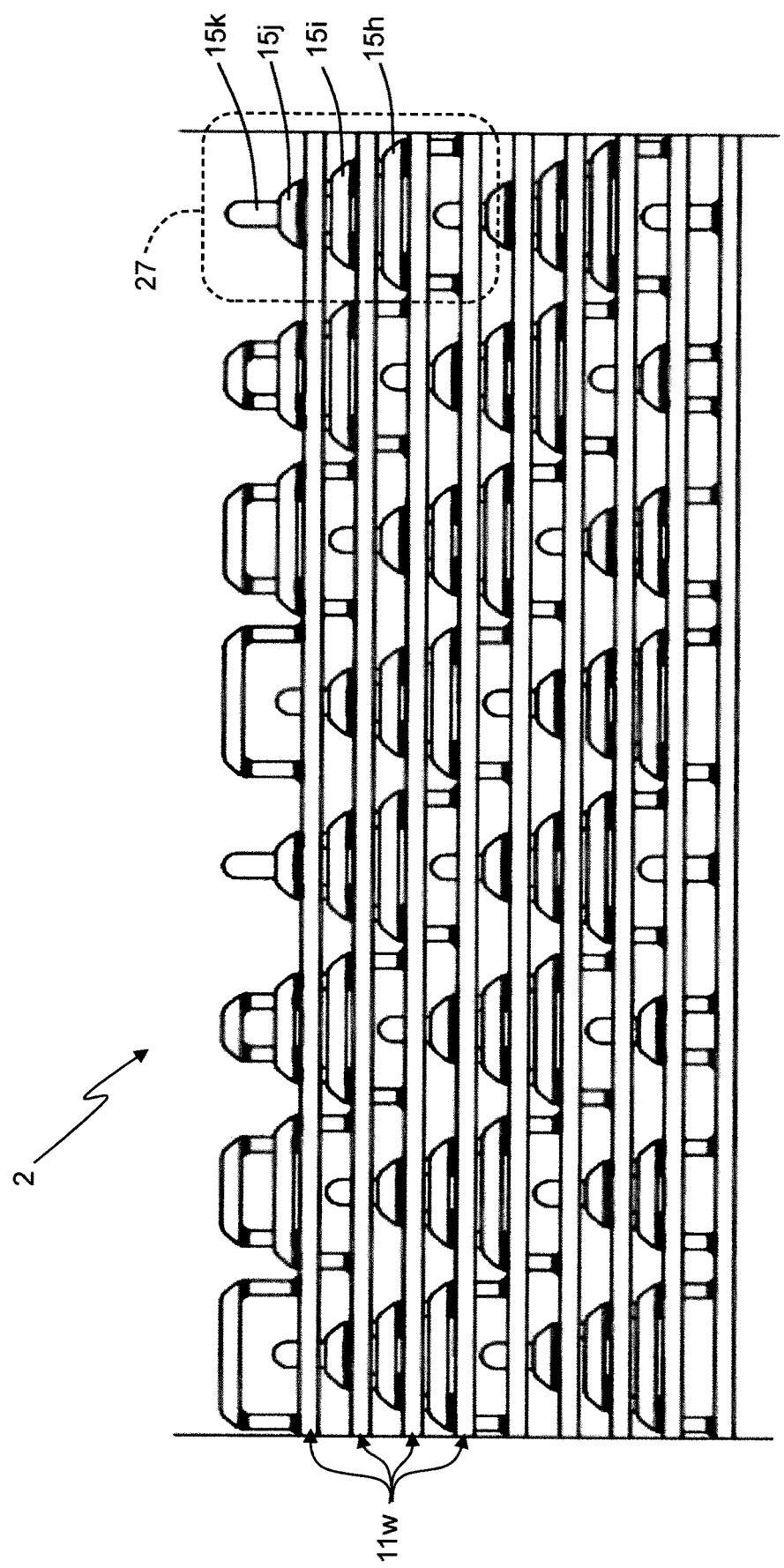
FIG. 22 shows an embodiment where coupling elements from four adjacent links form a converging series of interconnected coupling elements and where each link is provided with at least one group of coupling elements consisting of a starting, two intermediate and one ending coupling element located one after the other in the length of the link.

FIG. 22 shows an embodiment where each converging series 27 of coupling elements 15h-k in the mat 2 comprises four coupling elements 15h-k on an equal number of links 11w. Each link 11w comprises axially repeated groups of coupling elements 15h-k, each such group comprising a starting coupling element 15h, two intermediate coupling elements 15i,j and an ending coupling element 15k.

Of course, the links and link groups shown identically in the present application can be constructed with mutual differences.

Figure 23:
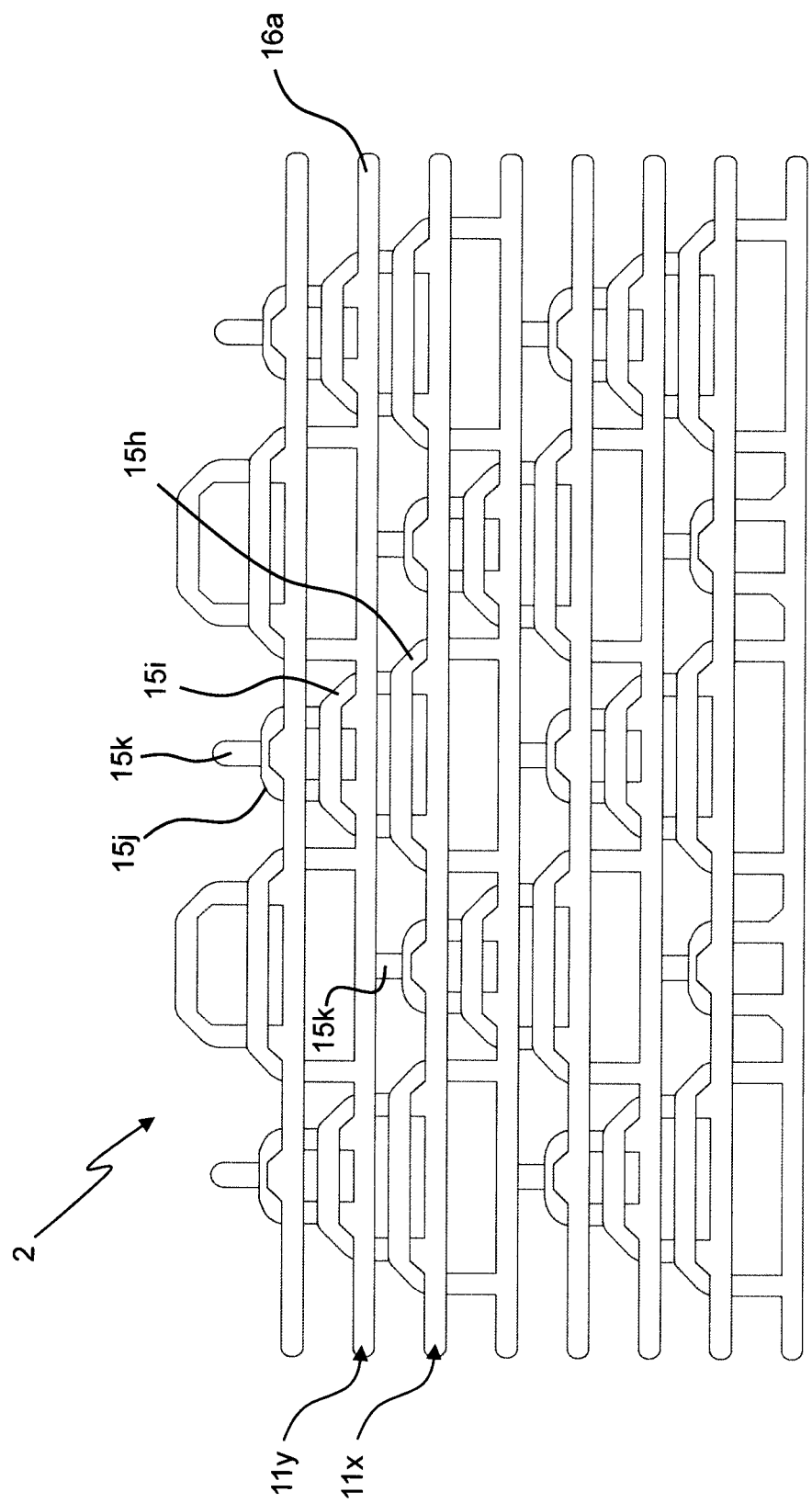
FIG. 23 shows another embodiment of a mat according to the invention.

FIG. 23 shows a mat 2 which also meets the requirement that links 11x with ending coupling elements 15k also are provided with intermediate coupling elements 15i, at the same time as the ending coupling elements 15k extend below the base portion 16a of adjacent link 11y, so that the links 11x,y cannot easily separate even if the mat 2 is unstretched.

FIGS. 24a and b show another design of coupling elements. Shown here are three different lengths but similarly designed coupling elements 15l,m,n mounted to each other, wherein coupling element 15n is located in or through coupling element 15m and coupling element 15m is located in or through coupling element 15l. In this form of coupling element 15l,m,n, all the side legs 17a,b are inclined at an angle relative to the base portion 16a of the link. This angle can vary but is here about 45 degrees. In FIG. 24a, the base portion 16a between the side legs 17a,b is closed with a bridging 18b whereby "closed loops" can be said to be formed. FIG. 24b shows the corresponding coupling elements 15l,m,n, but here the base portion 16a of the link lacks bridges at the respective coupling elements 15l,m,n, ie the coupling elements 15l,m,n can be said to form "open loops". In both of these variants of coupling elements 15l,m,n the special contact edges described earlier are missing but the mechanical contact between the links occurs between the side legs of the coupling elements 15l,m,n whereby the contact edges can be said to be integrated in the coupling elements 15l,m,n by their design.

FIGS. 25a and b show a further design of coupling elements. Shown here are three arcuate or U-shaped coupling elements 15o,p,q located in each other in a corresponding manner as in FIGS. 24a,b. A difference here is that no straight side legs or connecting beams can be identified as substantially the entire coupling element 15o,p,q is arcuate.

From the FIGS. 24a,b and 25a,b it is thus understood that the coupling elements can be designed in a number of different ways within the scope of the invention.

Although high-friction elements and low-friction elements on the links enable a very efficient pointing device, it is still a complication in the manufacture process to have to coat the links with these two materials. It would be an advantage if this could be eliminated. As the material of the links, preferably a metal such as steel, exhibits low friction against the user's fingers, it is difficult for the user to comfortably move a cylinder made up of links which lack high friction elements unless the cylinder is very light.

A problem in the manufacture of thin links for use with a mat has been that after bending the links, a curved deformed shape has been seen in the plane of the goods, probably due to the fact that they occur in the material of the link during manufacture when the links are bent. Such a slightly deformed cylinder does not in its entirety follow the user's small movements in the desired manner. The user's small movements across the axial extent of the links are not propagated to the entire mat. The links must be completely straight for proper function.

FIG. 26 shows an alternative embodiment of a link 11z. Two bending lines BLa and BLb are here marked with dashed lines, along which the link 11z and/or its coupling element 15z is bent. Parts of the base portion of the link lack coupling elements and are at the same time arranged between the bending lines BLa and BLb, so that these parts of the base portion are not bent during the manufacturing process. Bending thus takes place only by and at the coupling elements 15z and thus in limited places along the extension of the link 11z. In this way, the risk of the link being deformed is minimized. According to this embodiment of links 11z, the coupling elements are arranged in groups 29. The figure shows three groups 29 with three coupling elements each, but more or fewer groups are possible to arrange on one and the same link 11z.

The parts of the link which lack coupling elements are designed by their truss-patterned base portion 30 so that they are still rigid in the tangential direction of the mat but are still lighter than previously shown links or base portions due to the lack of coupling elements. The coupling elements 15a-z are thus arranged in groups at least for some links 11a-z, where each group of coupling elements 15a-z is connected to another group of coupling elements 15a-z via the truss-shaped base portion 30 of the link. The links bending lines BLa,BLb are thereby arranged outside the truss-shaped base portion 30 of the link 11a-z, seen in relation to the imaginary center axis C of the link. This construction/design has in practice enabled the manufacture of links of approximately halved weight, compared to links provided with coupling elements along the entire length of the link. Links with this design have proven to be able to be manufactured practically completely straight and without deformation.

The lower of the bending lines BLb shown in FIG. 27 can be omitted, resulting in even straighter links because the number of bending points on the link 11z is halved.

FIG. 27 shows a mat consisting of eight links 11z where each of the links 11z is formed with its coupling elements 15z in groups 29. It can be seen here that the coupling elements 15z of the mat form areas where coupling elements are concentrated; so-called coupling element areas 31.

The converging series that the coupling elements 15z here exhibits in each coupling element area 31, may be of the same type as shown in FIG. 23. However, it should be pointed out that other types of converging series may be included in the coupling element areas 31. The coupling element areas 31 need not be identical but may consist of differently shaped coupling elements. In this case, three coupling element areas 31 are shown, but also more or fewer are possible to distribute along the width of the mat.

Another problem has been identified when different types of cylinder structures for pointing devices were tested. The angles α and ɵ of the contact edges 19a,b were as shown in FIG. 6a, 135 degrees each. Noise in the form of a "clicking" or "rattling" sound sometimes occurred when this form of cylinder was rotated. This problem is due to the fact that the bearing points P between adjacent links change position along the contact edges when the mat is rotated around the beam and when adjacent links pass over/around the edge of the beam, especially if the radius of the beam edge is small compared to the width of the links. The bearing points P in this case do not appear to be sufficiently fixed but "wander" along the contact edges.

This is solved by arranging the contact edges, for two interconnected coupling elements, with a mutual angular difference, ie the angles α and θ are arranged so that they differ from each other. A preferred embodiment of this is shown in FIG. 28a,b.

FIG. 28a shows two coupling elements 15a and 15b belonging to two adjacent links 11a and 11b, Included in a mat, where everything is shown straight from above, ie in a perpendicular view to the plane of the mat. The contact edge 19a is formed with an angle ɵ of 135 degrees while the angle α of the contact edge 19b is 90 degrees. This embodiment with a 45 degree difference between the angles of the two contact edges 19a and 19b keeps the bearing points P in stable positions relative to the contact edges 19a,b and thus reduces alternatively eliminates noise from the mat, when the links 11z pass the edge of the pointing device's beam.

FIG. 28b shows the same coupling element but in perspective view. The figure shows the bearing points P more clearly.

FIG. 29a shows two interconnected coupling elements 15a,b where the angle α of the contact edges of one coupling element 15b is 112 degrees and the angle θ of the contact edges of the other coupling element 15a is 157 degrees. The angular difference θ–α is thus 45 degrees and this minimizes noise from the mat when it is used/rotated.

FIG. 29b correspondingly shows two interconnected links 11a and 11b where the angle a for one contact edge is 135 degrees and the angle θ for the other contact edge is 90 degrees. Here, too, the angular difference is α–θ=45 degrees, whereby noise is reduced when the links pass the edge of the beam.

FIG. 29c shows two interconnected links where the angle a of one link 118 is 135 degrees and the angle θ of the other link 11b is 125 degrees. The angular difference α–θ is thus only 10 degrees here. This small angular difference reduces the sound problem but to a lesser extent.

The design of the contact edges can thus be varied in a number of different ways within the scope of the invention.

The inventive construction of a cylinder or mat can be used as a conveyor belt, jalousie, bogie belt, caterpillar belt, drive belt/transmission element etc. In such cases, the cylinder preferably rotates about wheels and the tangential length of the cylinder often exceeds the width of the cylinder.

The links in such applications usually need to be made considerably larger and stronger than what is required for a pointing device, and the thickness of the goods can instead of an order of magnitude of one tenth of a millimeter amount to a number of millimeters or centimeters. Such a belt has the advantage of being robust, being able to be manufactured and assembled at a relatively low cost and giving low friction when rotating around the wheels and thus low power consumption for its propulsion.

The description above is primarily intended to facilitate the understanding of the invention, a flexible mat, a link or a method for manufacturing links, but the scope of protection is not limited to the embodiments described here, but also other variants and embodiments of the invention are fully possible and conceivable within the scope of the inventive concept and the scope of the following claims.

The invention claimed is:

1. A flexible mat (2) for use with a pointing device (1) arranged to control movement of a pointer or cursor on a monitor or display at a computer or other electronic device, the flexible mat (2) comprising:
a plurality of links (11a-z) arranged side by side, the plurality of links being substantially rigid in an axial direction and mutually rotatable at a limited angle, the plurality of links (11a-z) being provided with a base portion (16a) extending in a longitudinal direction or the axial direction of the plurality of links (11a-z), wherein:
the plurality of links (11a-z) comprise at least one coupling element (15a-z) arranged or integrated in or at the base portion (16a),
at least one link of the plurality of links or the at least one coupling element (15a-z) is bent along one or more bending lines (BL, BLa, BLb), or arranged with a radius forming a partially or a fully arched, curved, or arcuate link, and where the one or more bending lines (BL, BLa, BLb) extends substantially parallel to a center line (C),
the at least one coupling element (15a-z) of the at least one link of the plurality of links is mechanically connected to a coupling element (15a-z) of an adjacent link of the plurality of links (11a-z) in that the at least one coupling element (15a-z) of the at least one link of the plurality of links is at least partially inserted or located in or through the coupling element (15a-z) of the adjacent link of the plurality of links (11a-z), and
the plurality of links (11a-z) in the mat remain mutually rotatable or turnable a limited angle relative to each other.

2. The flexible mat (2) according to claim 1, wherein the at least one coupling element (15a-z) comprises contact edges (19a,b) arranged to form bearing points (P) between the plurality of links (11a-z), and wherein the contact edges (19a,b) at a bearing point (P) for two interconnected coupling elements (15a-z) are arranged with a mutual angular difference (⊖–α).

3. The flexible mat (2) according to claim 1, wherein the flexible mat (2) and the plurality of links (11a-z) are arranged to form a loop or cylinder.

4. The flexible mat (2) according to claim 1, wherein the at least one coupling element (15a-z) comprises side legs (17a,b) attached to the base portion (16a) of the at least one link of the plurality of links (11a-z) and a beam (18a) arranged between the outer ends of the side legs (17a,b).

5. The flexible mat (2) according to claim 4, wherein the base portion (16a) of the plurality of links (11a-z) closes or bridges a region between the side legs (17a, b) of at least some coupling elements (15a-z) whereby the coupling elements (15a-z) together with the base portion (16a) form a closed loop.

6. The flexible mat (2) according to claim 4, wherein the base portion (16a) of the plurality of links (11a-z) is open in the region between the side legs (17a,b) of at least some coupling elements (15a-z), whereby the coupling element (15a-z) form an arc or U-bracket.

7. The flexible mat (2) according to claim 4, wherein the side legs (17a,b) of the coupling elements (15a-z) are bent in at least two areas (20a,b), the side legs (17a,b) forming an angle (β) in relation to the base portion (16a) of the respective link.

8. The flexible mat (2) according to claim 1, wherein the coupling element (15a-z) of a first link of the plurality of links (11a-z) is mechanically coupled to the at least one coupling element (15a-z) of a second link of the plurality of links (11a-z)in that the at least one coupling element (15a-z) of the second link of the plurality of links (11a-z) is at least partially inserted or located through the coupling elements (15a-z) of the first link of the plurality of links (11a-z), and that the coupling element (15a-z) of a third link of the plurality of links (11a-z) is inserted or located through the coupling element (15a-z) of the second link of the plurality of links (11a-z).

9. The flexible mat (2) according to claim 1, wherein interconnected coupling elements (15a,b) of two adjacent links of the plurality of links (11a-z) are formed with an outer length (L1, L2) which differ from each other, whereby a first one of the at least one coupling element (15b) which is at least partially located through a second one of the at least one coupling element (15a) of the adjacent link (11a) is provided with a shorter outer length (L2).

10. The flexible mat (2) according to claim 1, wherein an inner length (13) of the coupling element (15a) of one link (11*a*) of the plurality of links is equal to or greater than an outer length (L2) of an interconnected coupling element (15*b*) of an adjacent link (11*b*) of the plurality of links.

11. The flexible mat (2) according to claim 1, wherein each link of the plurality of links (11*a-z*) consists of a metal foil.

12. The flexible mat (2) according to claim 1, wherein the at least one link of the plurality of links (11*a-z*) in the mat (2) is provided with at least one ending coupling element (15*k*) in a converging series (27) and at least one intermediate coupling element (15*i,j*) in another converging series.

13. The flexible mat (2) according to claim 1, wherein a first type of link (11*x*) of the plurality of links comprises ending coupling elements (15*k*) in a converging series and intermediate coupling elements (15*i*) in another converging series, and a second type of link (11*y*) of the plurality of links comprises starting coupling elements (15*h*) in a converging series and intermediate coupling elements (15*j*) in another converging series.

14. A method of manufacturing the plurality of links (11*a-z*) according to claim 1, the method comprising:
punching or etching the plurality of links (11*a-z*) or the coupling elements (15*a-z*) from a plate or foil-shaped material or goods.

15. A link (11*a-z*) for forming a flexible mat (2) for use with a pointing device (1) at a computer or other electronic device, the link being substantially rigid in an axial direction, the link (11*a-z*) being provided with a base portion (16*a*) extending in a longitudinal direction or the axial direction of the link (11*a-z*), wherein:
- the link (11*a-z*) comprises at least one coupling element (15*a-z*) arranged or integrated in or at the base portion (16*a*),
- the at least one coupling element (15*a-z*) is bent along one or more bending lines (BL, BLa, BLb), or arranged with a radius forming a partially or a fully arched, curved, or arcuate link, and where the one or more bending lines (BL, BLa, BLb) extends substantially parallel to a center line (C),
- the at least one coupling element (15*a-z*) of the link is arranged to mechanically connect to a coupling element (15*a-z* of an adjacent link (11*a-z*) in that the coupling element (15*a-z*) is at least partially insertable or locatable in or through the coupling element (15*a-z*) of the adjacent link (11*a-z*).

* * * * *